US012759329B2

(12) United States Patent
Kano et al.

(10) Patent No.: US 12,759,329 B2
(45) Date of Patent: Oct. 13, 2026

(54) ELECTRONIC APPARATUS

(71) Applicant: SEIKO EPSON CORPORATION, Tokyo (JP)

(72) Inventors: Tomohisa Kano, Shiojiri (JP); Hidenao Suzuki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 180 days.

(21) Appl. No.: 18/898,946

(22) Filed: Sep. 27, 2024

(65) Prior Publication Data

US 2025/0108646 A1 Apr. 3, 2025

(30) Foreign Application Priority Data

Sep. 29, 2023 (JP) ................................ 2023-169454

(51) Int. Cl.
*B41J 29/13* (2006.01)

(52) U.S. Cl.
CPC .................................... *B41J 29/13* (2013.01)

(58) Field of Classification Search
CPC ..... B41J 29/13; G03G 21/16; G03G 21/1633; G03G 21/1638; G03G 21/1647; H04N 1/00554; H04N 1/00551; H04N 1/00546; H04N 1/00543
See application file for complete search history.

(56) References Cited

U.S. PATENT DOCUMENTS

2006/0283695 A1* 12/2006 Deshimaru .......... H01H 13/183 200/293
2010/0051426 A1* 3/2010 Kawarago .......... G03G 21/1633 200/50.1

FOREIGN PATENT DOCUMENTS

JP 2007-101918 A 4/2007

* cited by examiner

*Primary Examiner* — Stephen D Meier
*Assistant Examiner* — Thomas Ray Knief
(74) *Attorney, Agent, or Firm* — WORKMAN NYDEGGER

(57) ABSTRACT

A printing apparatus includes an apparatus main body, a door portion, a pressing portion, a deformation portion, and a detection unit, wherein a hole into which the pressing portion is inserted is formed at the apparatus main body, the pressed surface and the detection unit are pressed by the pressing portion inserted through the hole, the deformation portion includes a plate-like member having flexibility, one end and another end in a long side direction of the plate-like member are fixed to the apparatus main body, the detection unit is disposed at the apparatus main body so as to be covered with the pressed surface, and a width of the pressed surface is larger than a width of the detection unit and a width of the hole.

10 Claims, 21 Drawing Sheets

ELECTRONIC APPARATUS

The present application is based on, and claims priority from JP Application Serial Number 2023-169454, filed Sep. 29, 2023, the disclosure of which is hereby incorporated by reference herein in its entirety.

BACKGROUND

1. Technical Field

The present disclosure relates to an electronic apparatus.

2. Related Art

In the related art, there has been known an electronic apparatus including an openable and closable door portion, and a detection unit that detects opening and closing of the door portion. For example, JP 2007-101918 A discloses an image forming apparatus including a member to be detected disposed in an opening/closing body, an opening/closing detector that detects the member to be detected to detect an open/closed state of the opening/closing body, and a contact prevention portion that protects the member to be detected.

However, in the apparatus described in JP 2007-101918 A, there is a problem that it is difficult to suppress breakage of the opening/closing detector which is a detection unit. Specifically, the member to be detected is inserted into the opening/closing detector through an opening, and a closed state of the opening/closing body is detected. The contact prevention portion prevents contact between the member to be detected and the opening to protect the member to be detected, when external force in a direction different from an assumed direction acts on the member to be detected.

However, in many of such apparatuses, operation is stopped when the opening/closing body is in an open state. For this reason, there is a case where the closed state of the opening/closing body is intentionally erroneously detected by inserting an object imitating the member to be detected from the opening in operation confirmation, adjustment, or the like in maintenance work. At this time, there was a possibility that unintended external force acts on the opening/closing detector and the opening/closing detector is broken. That is, there has been a demand for an electronic apparatus in which breakage of a detection unit is suppressed.

SUMMARY

An electronic apparatus includes an apparatus main body, a door portion supported by the apparatus main body so as to be openable and closable, a pressing portion disposed at the door portion, a deformation portion that is deformable between an open state shape and a closed state shape in accordance with an open/closed state of the door portion by an action of the pressing portion, and is configured to be deformed to the closed state shape when a pressed surface is pressed by the pressing portion, and a detection unit configured to detect that the door portion is in a closed state by being pressed by the pressing portion via the pressed surface, wherein a hole into which the pressing portion is inserted is formed at the apparatus main body, the pressed surface and the detection unit are pressed by the pressing portion inserted through the hole, the deformation portion includes a plate-like member having flexibility, one end and another end in a long side direction of the plate-like member are fixed to the apparatus main body, the detection unit is disposed at the apparatus main body so as to be covered with the pressed surface, and a width of the pressed surface is larger than a width of the detection unit and a width of the hole.

DESCRIPTION OF EMBODIMENTS

In embodiments described below, a printing apparatus will be exemplified as an electronic apparatus with reference to the drawings. In each of the following drawings, XYZ axes, which are coordinate axes orthogonal to each other, are added as necessary, a direction indicated by each arrow is a + direction, and a direction opposite to the + direction is a − direction. A +Z direction may be referred to as above and a −Z direction may be referred to as below. In each of the following drawings, a size of each member is different from an actual size for convenience of illustration.

1. First Embodiment

Figure 1:
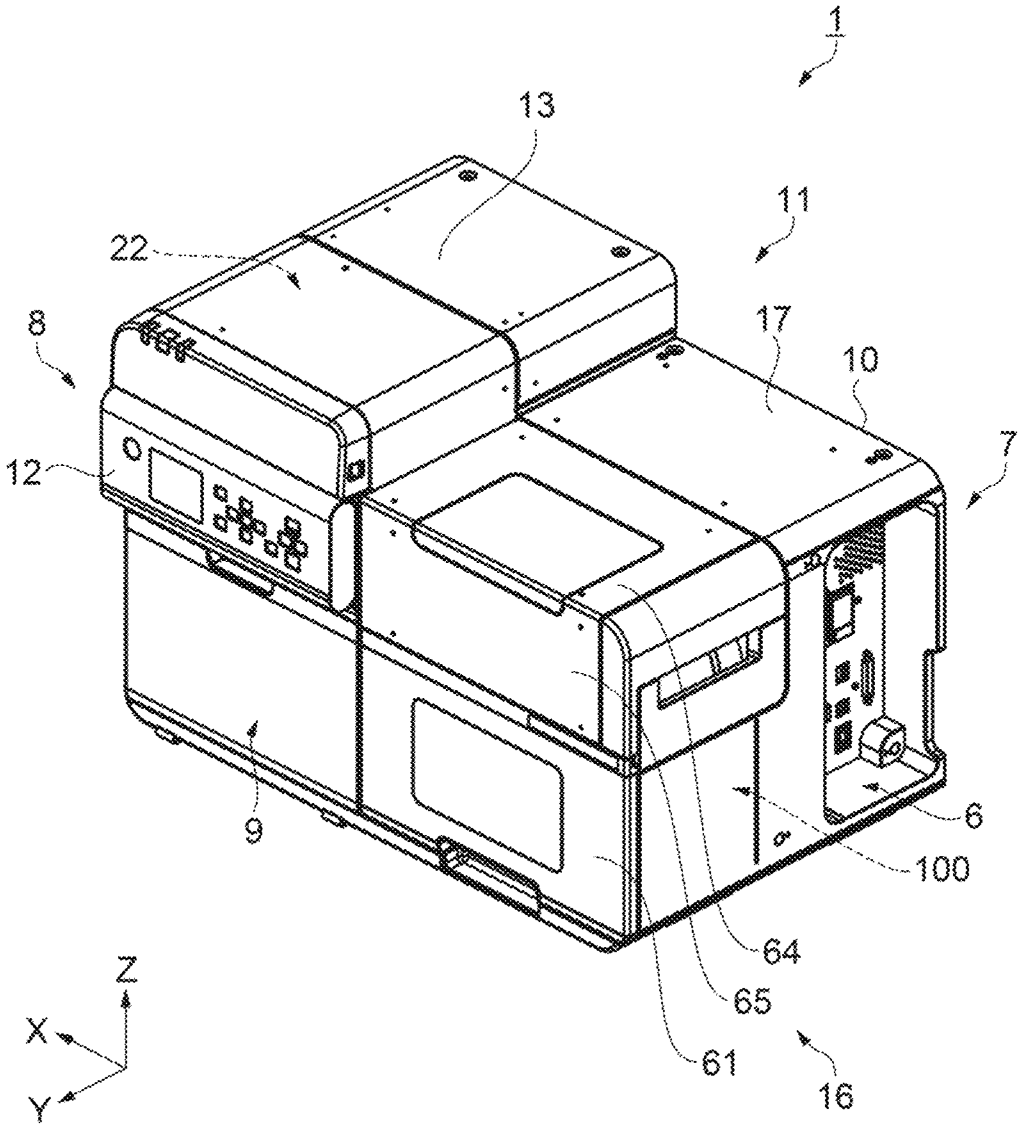
FIG. 1 is a perspective view illustrating an exterior of a printing apparatus according to a first embodiment.

As illustrated in FIG. 1, a printing apparatus 1 according to the present embodiment includes an apparatus main body 10 and a door portion 16. The door portion 16 includes a top surface panel portion 64, a front surface panel portion 65, and a lower cover portion 61. FIG. 1 illustrates a state where the door portion 16 is closed in the printing apparatus 1.

The apparatus main body 10 has a shape in which two cubes having different heights in a Z direction are coupled in a direction along an X-axis. The apparatus main body 10 includes a front surface 9, a top surface 11, a back surface 7, and side surfaces 6 and 8. In the apparatus main body 10, the front surface 9 is a surface facing forward, the top surface 11 is a surface facing upward, the back surface 7 is a surface facing backward, the side surface 6 is a surface facing in a −X direction, and the side surface 8 is a surface facing in a +X direction. The apparatus main body 10 is a housing formed by combining panel-like members and the like constituting these surfaces. Each member described later is accommodated inside the housing.

The top surface 11 includes a top surface portion 17, the top surface panel portion 64 of the door portion 16, and a top surface portion 13. In the apparatus main body 10, the top surface portion 13 is disposed in the +X direction, and top surface portion 17 and top surface panel portion 64 are disposed in the −X direction of top surface portion 13. The top surface portion 17 is adjacent to the top surface panel portion 64 in a direction along a Y-axis, and is disposed in a −Y direction of the top surface panel portion 64.

In plan view from above, each of the top surface portion 13, the top surface portion 17, and the top surface panel portion 64 has a substantially rectangular shape. The top surface portion 13, the top surface portion 17, and the top surface panel portion 64 are disposed along an XY plane. In a direction along a Z-axis, the top surface portion 13 is different in height from the top surface portion 17 and the top surface panel portion 64. The top surface portion 17 and the top surface panel portion 64 have substantially the same heights. The top surface portion 13 protrudes to an upper side than the top surface portion 17 and the top surface panel portion 64.

In a state where the door portion 16 is closed, the front surface panel portion 65 and the lower cover portion 61 constitute a region in the −X direction of the front surface 9, and the top surface panel portion 64 constitutes a region in front of the top surface portion 17.

The front surface 9 is provided with an operation panel 12. In plan view from a +Y direction, the operation panel 12 is disposed in a region corresponding to the top surface portion 13 of the front surface 9, specifically, in the +X direction, and on an upper side. Although not illustrated, the operation panel 12 includes a display functioning as a display unit for displaying predetermined information, and an operator such as an operation button. Various operations of the printing apparatus 1 can be manipulated via the operation panel 12. The operation panel 12 may be a touch panel type display device.

The printing apparatus 1 includes a printing unit 22. The printing unit 22 is present inside the apparatus main body 10, and is disposed below the top surface portion 13. The printing unit 22 includes a linear inkjet head. The printing apparatus 1 is an inkjet printer. In the printing apparatus 1, ink is caused to be ejected from the inkjet head, and to adhere to a printing medium, and characters or images are printed on the printing medium.

The top surface portion 13 includes a cover portion. The cover portion includes a region in the +Y direction of the top surface portion 13. By opening the cover portion, it is possible to perform maintenance work and adjustment of the printing unit 22 and the like.

The printing medium used for printing in the printing apparatus 1 is a cut sheet cut into a predetermined size or a continuous sheet. These sheets are formed of paper, a synthetic resin, or the like. These sheets may be, for example, of fine paper that is suitable for ink jet-type printing and that is subjected to surface processing to enhance ink absorbency and fixability.

Examples of the continuous sheet include a roll sheet accommodated in the printing apparatus 1 in a state of being wound in a roll shape, and a fanfold sheet supplied to the printing apparatus 1 from an outside of the printing apparatus 1 in a state of being folded. As the roll sheet, in addition to a sheet in which plain paper or fine paper is wound in a roll shape, a label sheet in which labels of a standard size having an adhesive on back surfaces are arranged on release paper serving as a mount and wound in a roll shape may be used. In the present embodiment, a label sheet 100 wound in a roll shape is used as the printing medium. The printing apparatus 1 is a label printer.

The label sheet 100 is present inside the apparatus main body 10, and is disposed below the top surface panel portion 64. In the label sheet 100, labels of a predetermined size having an adhesive on back surfaces thereof are attached on a mount on which release paper that can be peeled off from the adhesive is formed in a long length.

In the label sheet 100, a plurality of the labels are disposed at equal intervals in a longitudinal direction of the mount. The printing apparatus 1 transports the label sheet 100, and prints characters or images on a printing surface of each label on the label sheet 100.

Figure 2:
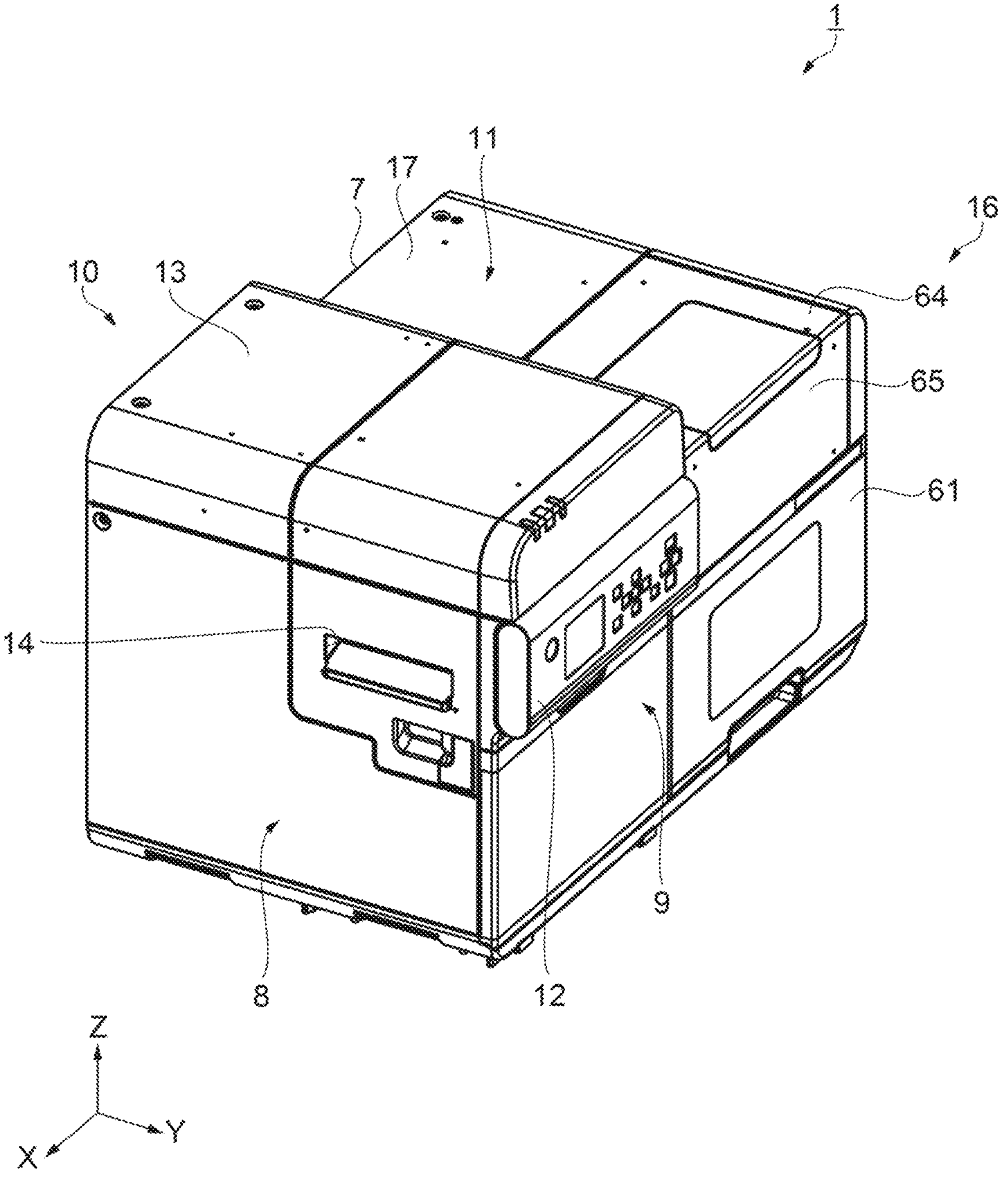
FIG. 2 is a perspective view illustrating the exterior of the printing apparatus.

As illustrated in FIG. 2, the side surface 8 is provided with a sheet discharge port 14. The sheet discharge port 14 is a slit through which the label sheet 100 can be caused to pass. The label sheet 100 subjected to printing is discharged outward from an inside of the printing apparatus 1 via the sheet discharge port 14. In the printing apparatus 1, an operation unit, a display unit, and the like are not provided at the side surface 8 at which the sheet discharge port 14 is formed.

Figure 3:
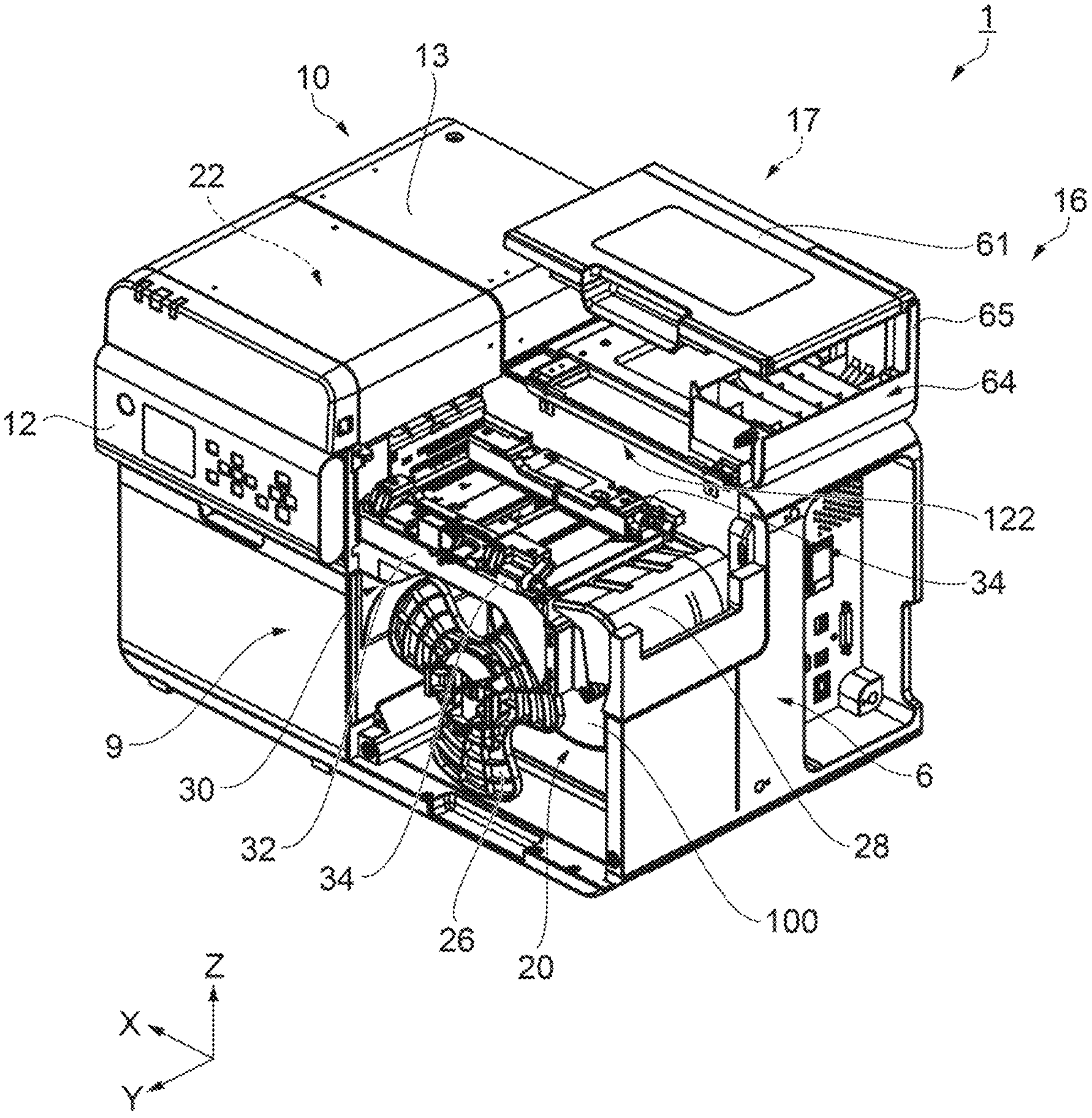
FIG. 3 is a perspective view illustrating the exterior of the printing apparatus provided with a door portion.

As illustrated in FIG. 3, in the printing apparatus 1, the door portion 16 can be opened. The door portion 16 is supported by the apparatus main body 10 so as to be openable and closable, and rotates with a coupling portion 122 provided at a substantially center in the direction along the Y-axis as a fulcrum. Accordingly, the door portion 16 can be opened and closed in the apparatus main body 10. In the following description, a state where the door portion 16 is fully opened is also referred to as a door opened state, and a state where the door portion 16 is fully closed is also referred to as a door closed state. FIG. 3 illustrates the door opened state, and FIGS. 1 and 2 described above illustrate the door closed state.

Inside the door portion 16, an accommodation portion 20 for accommodating the label sheet 100 is provided. The accommodation portion 20 is disposed in a region close to the side surface 6 in side view from the +Y direction. In the printing apparatus 1, when the accommodation portion 20 is exposed by opening the door portion 16, the label sheet 100 can be attached and detached. In addition, when the door portion 16 is opened, members such as a roll shaft 26, a sheet guide unit 30, a lower guide member 32, and a sheet pressing member 34 are also exposed, thus adjustment and maintenance work of the above-described members relating to transport of the label sheet 100 can be performed. Functions of these members will be described later.

Figure 4:
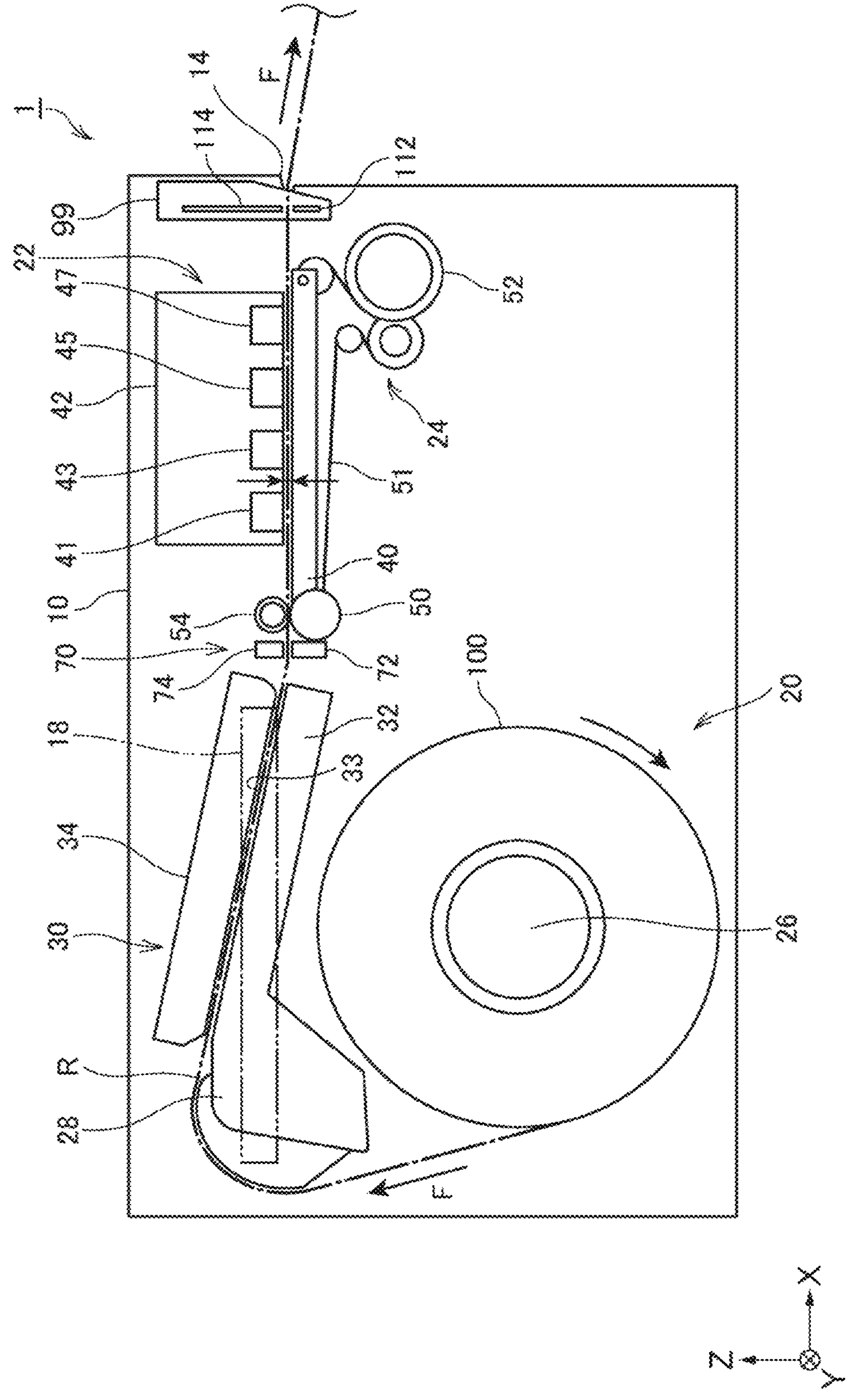
FIG. 4 is a schematic cross-sectional view illustrating a configuration of a transport path.

As illustrated in FIG. 4, the printing apparatus 1 includes the accommodation portion 20 described above, the printing unit 22 that performs printing on the label sheet 100, and a transport unit 24 that transports the label sheet 100 from the accommodation portion 20 to the printing unit 22. In the printing apparatus 1, the accommodation portion 20 is provided in the −X direction, and the printing unit 22 is provided in the +X direction of the accommodation portion 20. The transport unit 24 is provided below the printing unit 22.

The accommodation portion 20 includes the roll shaft 26 to which the label sheet 100 is attached. The roll shaft 26 is a rod-shaped member supported so as to be rotatable in a circumferential direction. The label sheet 100 is accommodated in the accommodation portion 20 by inserting the roll shaft 26 into a center of a roll. For example, a driving device such as a motor may be coupled to the roll shaft 26, and the roll shaft 26 may rotate in accordance with driving of the driving device. In the printing apparatus 1, the label sheet 100 also rotates as the roll shaft 26 rotates.

The printing apparatus 1 includes a transport path R. In the transport path R, the label sheet 100 attached to the roll shaft 26 is pulled out at one end, and transported to the sheet discharge port 14 after performing printing.

In the transport path R, a tension lever 28 is attached above the label sheet 100 accommodated in the accommodation portion 20. The tension lever 28 includes a curved surface in a circumferential direction and is formed in a columnar shape extending in the direction along the Y-axis. The tension lever 28 applies tension to the label sheet 100 to prevent the label sheet 100 from slackening. The label sheet 100 is pulled out upward at the one end, comes into contact with the tension lever 28, is bent by the tension lever 28, and then is transported in the +X direction.

The sheet guide unit 30 is provided in the +X direction of the tension lever 28. The sheet guide unit 30 guides the label sheet 100 in the +X direction, and suppresses skewing and deviation in transport of the label sheet 100. The sheet guide unit 30 includes the lower guide member 32 that supports the label sheet 100 from below, and a pair of the sheet pressing members 34 located on an upper surface side of the label sheet 100.

The lower guide member 32 includes a flat surface 33 extending along the X-axis. The flat surface 33 has a width dimension longer than a width dimension of the label sheet 100 in the direction along the Y-axis. The label sheet 100 is placed on and supported by the flat surface 33 of the lower guide member 32.

The sheet pressing member 34 is located above the label sheet 100 so as to face the lower guide member 32, and suppress floating of the label sheet 100. The sheet pressing members 34 are disposed at respective portions located at both ends of the lower guide member 32 along a direction intersecting a transport direction F. Each of the sheet pressing members 34 is provided so as to be rotatable with a rotation axis parallel to the transport direction F as a rotational center. The sheet pressing member 34 is rotatable from a position facing the flat surface 33 with a predetermined gap therebetween to a position separated from the flat surface 33.

The label sheet 100 is disposed at the flat surface 33 in a state where each of the sheet pressing members 34 is disposed at a position separated from the flat surface 33. Thereafter, the sheet pressing member 34 is rotated to a position facing the flat surface 33 with a predetermined gap therebetween, so that the label sheet is sandwiched between the lower guide member 32 and the sheet pressing member 34.

In the sheet guide unit 30, the label sheet 100 is transported in a state of being sandwiched between the lower guide member 32 and the sheet pressing member 34. The sheet guide unit 30 functions as a guide member for the label sheet 100.

The printing unit 22 that performs printing on the label sheet 100 is provided in the +X direction of the sheet guide unit 30. The printing unit 22 includes a platen 40 and an inkjet head 42. The inkjet head 42 sprays ink of four colors of cyan, magenta, yellow, and black, for example, and causes the ink to adhere to a printing surface of the label sheet 100.

The inkjet head 42 includes a nozzle unit 41 that sprays a black ink, a nozzle unit 43 that sprays a cyan ink, a nozzle unit 45 that sprays a magenta ink, and a nozzle unit 47 that sprays a yellow ink. Each of the nozzle units 41, 43, 45, and 47 includes a nozzle row (not illustrated) including a plurality of nozzles for splaying the ink. The nozzle rows are arranged in a row in a width direction of the label sheet 100.

In the nozzle units 41, 43, 45, and 47, the nozzles are arranged in a direction intersecting the transport direction F, for example, along a direction orthogonal to the transport direction F. The direction in which the nozzles are arranged coincides with the width direction of the label sheet 100. The inkjet head 42 functions as an image forming unit.

As described above, since the inkjet head 42 is of a line type, scanning is not performed in the width direction of the label sheet 100. The nozzle rows of the nozzle units 41, 43, 45, and 47 are disposed in a width at least equal to a printable range of the label sheet 100 or wider. In the printing apparatus 1, the printable range corresponds to the printing surface of the label sheet 100. Note that in the printing apparatus 1, the configuration in which the nozzle units 41, 43, 45, and 47 are disposed in this order along the transport direction F of the label sheet 100 has been exemplified, but the present disclosure is not limited thereto.

The platen 40 includes a flat surface disposed parallel to the transport direction F. This flat surface is located below the transport path R and faces the inkjet head 42. The nozzle units 41, 43, 45, and 47, and the platen 40 are disposed with a gap which is a so-called platen gap therebetween.

The platen 40 includes a flat upper surface that supports the label sheet 100 from below. The platen 40 is provided over at least an entire printing range in the printing unit 22. The upper surface of the platen 40 is disposed substantially horizontally in an installation state and a use state of the printing apparatus 1.

The transport unit 24 includes a columnar transport roller 50. The transport roller 50 extends such that a longitudinal direction thereof is along a direction intersecting the transport direction F, and is provided so as to be rotatable in a circumferential direction. The transport roller 50 is disposed between an end portion in the +X direction of the sheet guide unit 30, and an end portion in the −X direction of the platen 40 in the transport direction F. The transport roller 50 is disposed near an end portion in the +X direction of the flat surface 33 included in the lower guide member 32.

A driven wheel (not illustrated) is provided at one end portion of the transport roller 50. A transport motor 52 includes a drive shaft (not illustrated). A transmission belt 51 is stretched around the driven wheel and the drive shaft. The transport roller 50 and the transport motor 52 are coupled to each other via the transmission belt 51. The transport motor 52 is a driving device that rotationally drives the transport roller 50. The transport motor 52 and the transmission belt 51 are provided below the platen 40.

The transport unit 24 includes a plurality of driven rollers 54. The driven roller 54 is cylindrical, and a circumferential surface thereof is formed of a flexible material such as a rubber material. Each of the plurality of driven rollers 54 is rotatably disposed along a longitudinal direction of the transport roller 50. Each of the driven rollers 54 is biased so that the circumferential surface thereof comes into contact with a circumferential surface of the transport roller 50. Accordingly, the transport roller 50 and the driven roller 54 are disposed in contact with each other in a state where the circumferential surfaces thereof face each other. The transport roller 50 is disposed on the lower guide member 32 side, and the driven roller 54 is disposed on the sheet pressing member 34 side.

Note that the transport roller 50 may be disposed on the lower guide member 32 side, in other words, on the platen 40 side. Further, the transport unit 24 may include a transporting belt movable above the upper surface of the platen 40 instead of the transport roller 50.

In the transport unit 24, by driving the transport motor 52, the transport roller 50 is rotationally driven via the transmission belt 51, and the driven roller 54 follows to be rotationally driven. When the label sheet 100 is loaded between the lower guide member 32 and the sheet pressing member 34, the label sheet 100 is sandwiched between the transport roller 50 and the driven roller 54, and is transported to the printing unit 22 by the rotation of the transport roller 50.

The label sheet 100 is placed on the flat surface 33 and sent out from the sheet guide unit 30, and is inserted and sandwiched between the transport roller 50 and the driven roller 54. When the transport roller 50 rotates in this state, the label sheet 100 is transported to the printing unit 22. In the printing apparatus 1, the transport roller 50 and the driven roller 54 form a transport roller pair.

In the printing apparatus 1, a label detector 70 is provided on the transport path R. The label detector 70 detects a leading end and a trailing end of the label sheet 100, and a leading end and a trailing end of the label.

The label detector 70 of the present embodiment is disposed downstream of the sheet guide unit 30 and upstream of the transport roller 50. The label detector 70 is, for example, an optical transmission-type sensor including a light-emitting unit 72 on a lower surface side of the label sheet 100 and a light-receiving unit 74 on the upper surface side of the label sheet 100 in the transport path R. The light-emitting unit 72 and the light-receiving unit 74 are disposed to face each other along the Z-axis with an interval therebetween that allows the label sheet 100 to pass therethrough. In other words, the light-emitting unit 72 and the light-receiving unit 74 are disposed to face each other along a thickness direction of the label sheet 100. The light-emitting unit 72 and the light-receiving unit 74 are disposed at substantially the same positions in the direction along the X-axis.

Note that the label detector 70 may be disposed downstream of the transport roller 50 and upstream of the inkjet head 42. In addition, the light-emitting unit 72 may be disposed on the lower guide member 32 side, and the light-receiving unit 74 may be disposed on the sheet pressing member 34 side. In this case, the light-emitting unit 72 may be disposed on the platen 40 side, and the light-receiving unit 74 may be disposed on the inkjet head 42 side.

In the label detector 70, the light-emitting unit 72 and the light-receiving unit 74 are disposed at positions such that the light-receiving unit 74 can receive light emitted from the light-emitting unit 72 at predetermined signal intensity. An output value indicating an amount of light received by the light-receiving unit 74 is different for each of a case where there is no label sheet 100 directly below the light-receiving unit 74, a case where there is the mount, and a case where there is the label. That is, light emitted from the light-emitting unit 72, light transmitted through the mount, and light transmitted through the label sheet 100 are different from each other in the signal intensity. Therefore, the label detector 70 can detect the leading end and the trailing end of the label sheet 100, and the leading end and the trailing end of the label, based on the output values indicating the amounts of light received by the light-receiving unit 74.

A cutter unit 99 is disposed downstream in the transport direction F of the inkjet head 42, specifically, in the +X direction of the inkjet head 42. The cutter unit 99 includes a fixed blade 112 and a movable blade 114 disposed with the transport path R interposed therebetween. The movable blade 114 is coupled to a driving device such as a motor that drives the cutter, for example, via a gear. In the cutter unit 99, by driving the motor, the movable blade 114 moves to the fixed blade 112 side and cuts the label sheet 100.

The cutter unit 99 may cut the label sheet 100 so as to leave a part of the label sheet 100 in the width direction, or may completely cut the label sheet 100. The printed label sheet 100 subjected to printing is cut to a predetermined length by the cutter unit 99, and is discharged from the sheet discharge port 14. The cutter unit 99 may be formed separately from the printing apparatus 1, and for example, may be detachably disposed in the +X direction of the printing apparatus 1.

The printing apparatus 1 includes a control board 18. The control board 18 integrally controls operation of each configuration of the printing apparatus 1. The control board 18 includes a CPU, a ROM, a RAM, and the like, as a calculation execution unit. The ROM of the control board 18 stores firmware executable by the CPU, data related to the firmware, and the like in a non-volatile manner. In addition, the RAM temporarily stores the data related to the firmware executed by the CPU.

The control board 18 may include other peripheral circuits and the like, and may include a storage unit capable of storing various programs and data such as control programs and data related to these control program in a non-volatile manner. The control board 18 detects an operation on the printing apparatus 1, a transport amount of the label sheet 100, and the like. The control board 18 controls the driving device included in the printing apparatus 1 such as the transport motor 52. In the inkjet head 42, the control board

18 supplies voltage to a pump that supplies ink from an ink tank (not illustrated) and piezoelectric elements included in the nozzle units 41, 43, 45, and 47 of the inkjet head 42 to operate the components.

The control board 18 is formed to operate the light-emitting unit 72 and the light-receiving unit 74 and to be capable of acquiring a detection value of the label detector 70. The label detector 70 functions as a detector in cooperation with the control board 18.

The control board 18 is also electrically coupled to a detection unit 150 described later. The detection unit 150 detects an open/closed state of the door portion 16 and transmits opening/closing information of the door portion 16 to the control board 18. For example, when the door portion 16 is not in the door closed state, the control board 18 performs control to stop a part or all of driving of the transport unit 24 and the like. The detection unit 150 is an example of a detection unit of the present disclosure.

Figure 5:
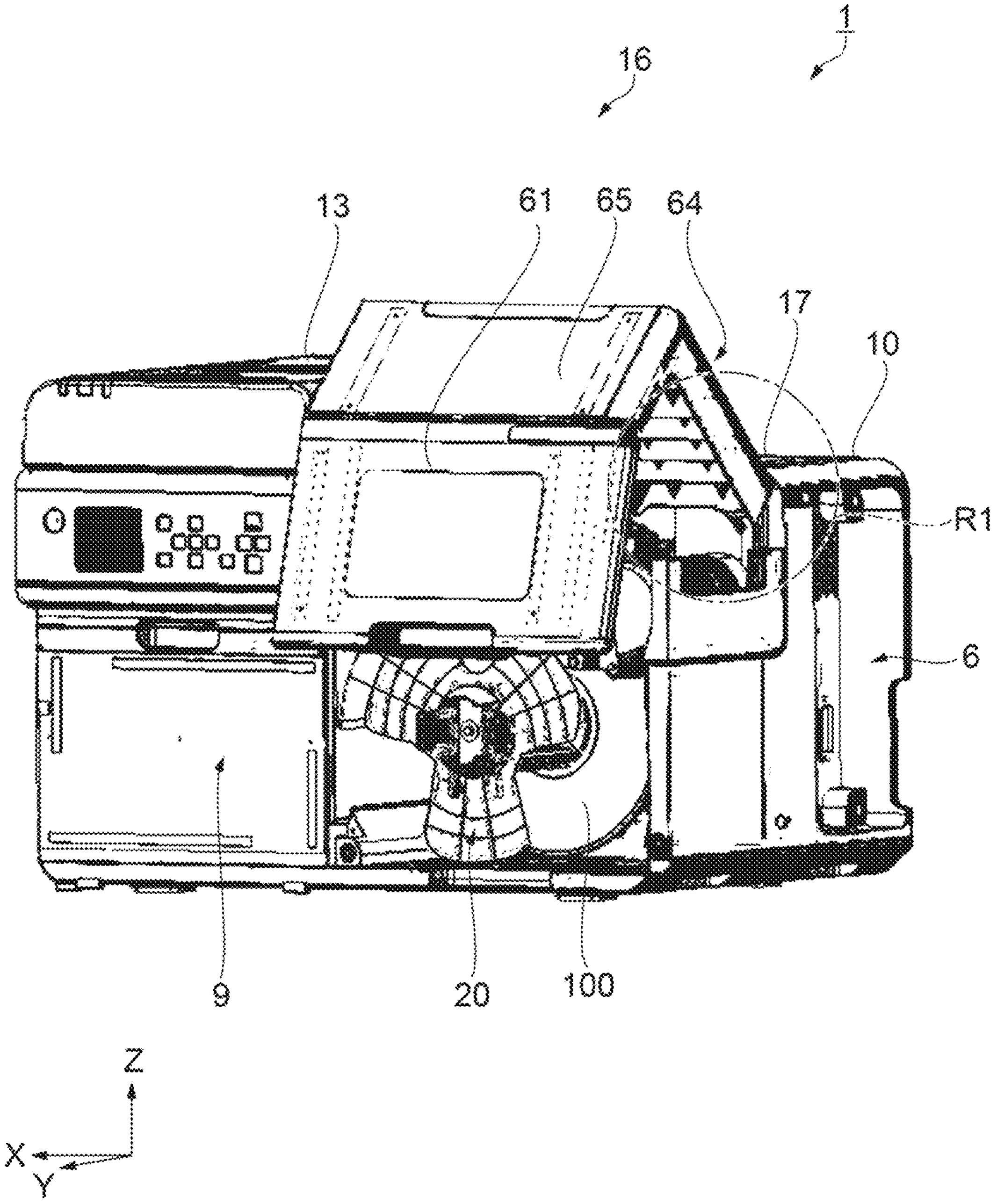
FIG. 5 is a perspective view illustrating an exterior of the door portion in an intermediate state between a door opened state and a door closed state.

As illustrated in FIG. 5, when the door portion 16 is opened from the door closed state, an end portion of the top surface panel portion 64 in the +Y direction rises upward with respect to the top surface portion 17. At the same time, an angle formed by the front surface panel portion 65 and the lower cover portion 61 is changed at a boundary along the X-axis. From this state, the top surface panel portion 64 and the front surface panel portion 65 further rise, and the angle of the bending at the above boundary increases, resulting in the door opened state.

Figure 6:
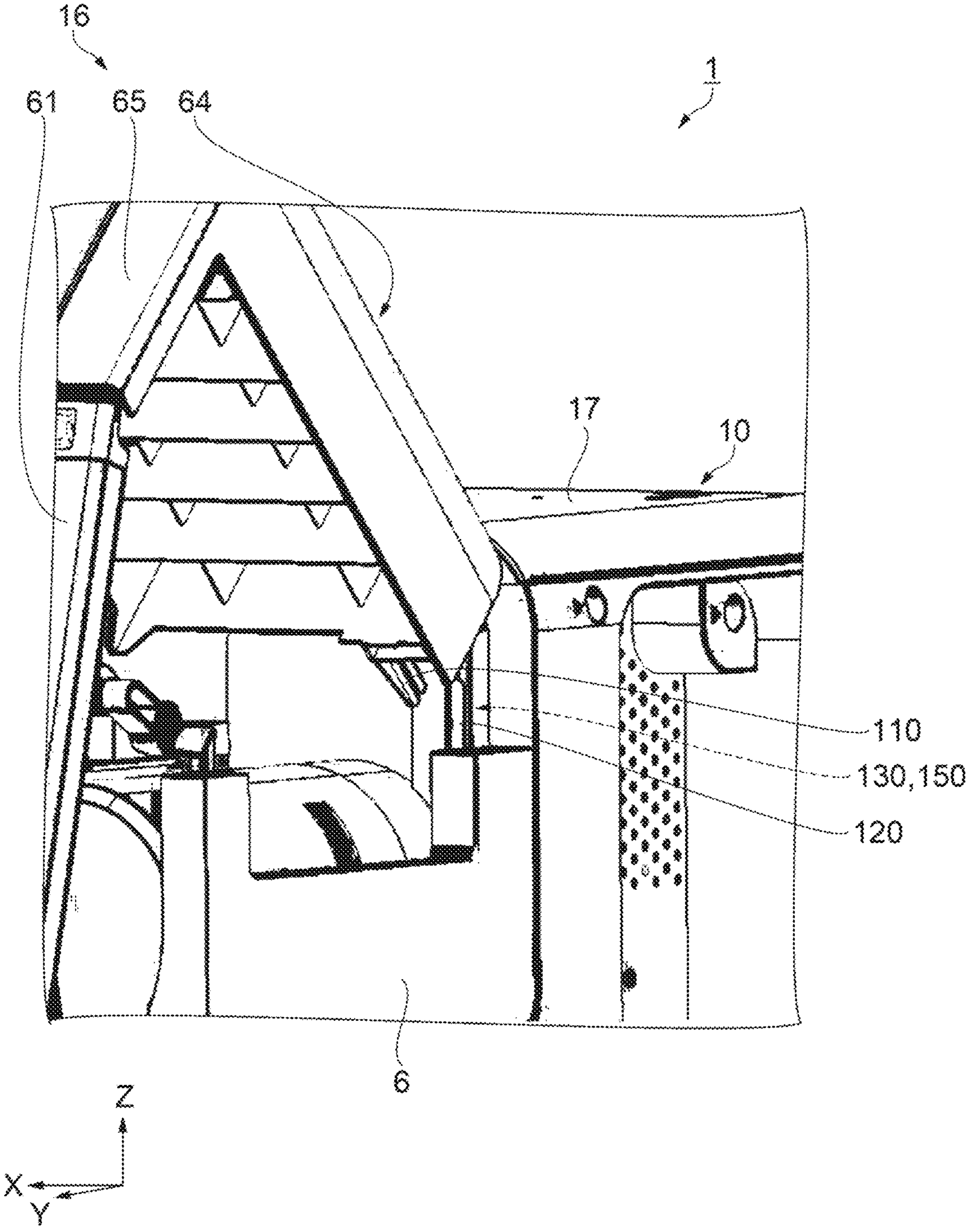
FIG. 6 is an enlarged view of a range R1 in FIG. 5.

As illustrated in FIG. 6, the printing apparatus 1 includes a pressing portion 110, a deformation portion 130, and the detection unit 150. A hole 120 through which the pressing portion 110 is inserted in the door closed state is formed at the side surface 6 of the apparatus main body 10.

The pressing portion 110 is disposed at the top surface panel portion 64 of the door portion 16. The pressing portion 110 is provided at a position corresponding to the hole 120 so as to protrude.

The deformation portion 130 and the detection unit 150 are disposed inside the apparatus main body 10. In the door closed state, the deformation portion 130 and the detection unit 150 come into contact with the pressing portion 110 inserted from the hole 120.

Figure 7:
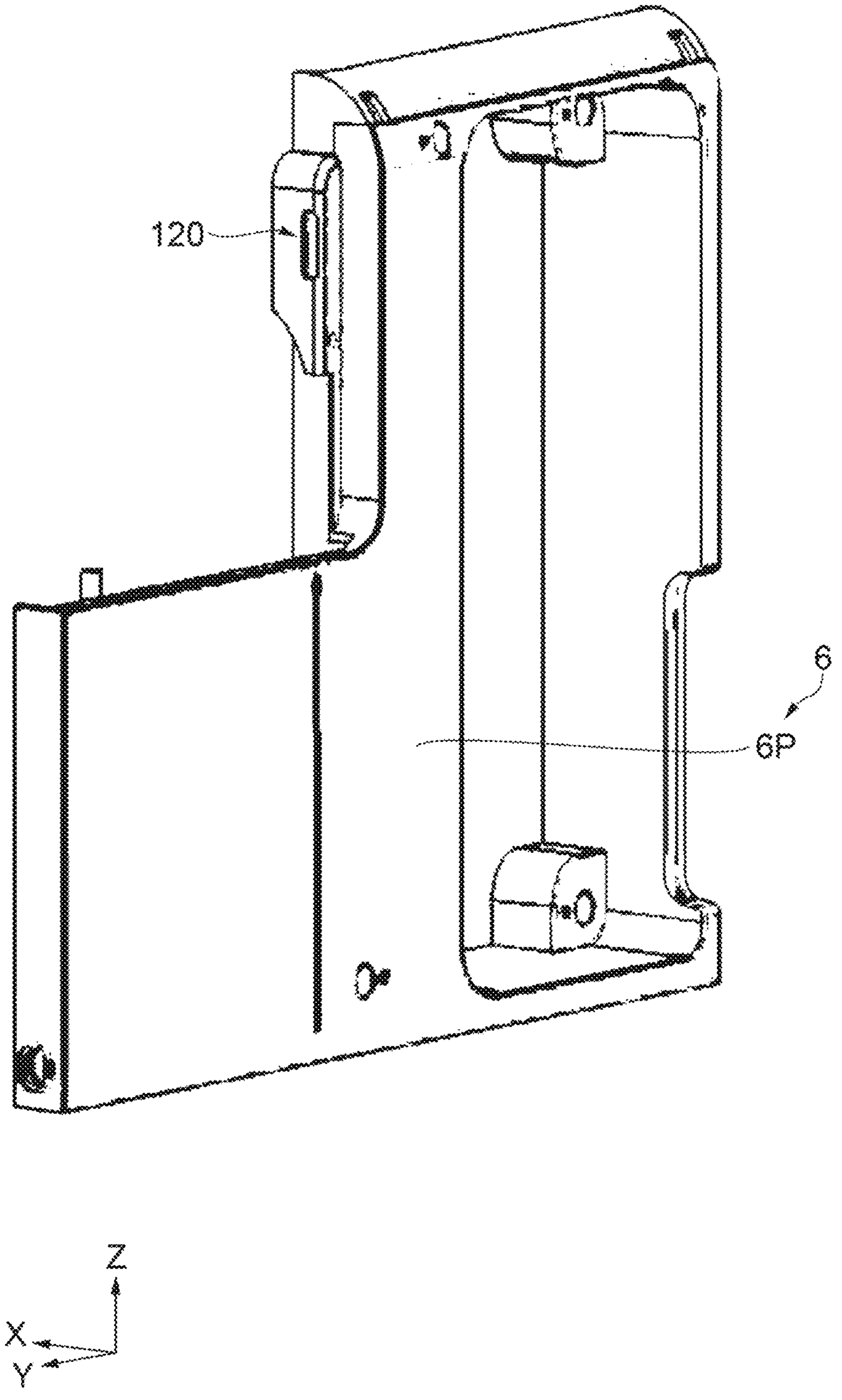
FIG. 7 is a perspective view illustrating an exterior of an exterior panel at which a hole is disposed.

As illustrated in FIG. 7, the side surface 6 includes an exterior panel 6P. The exterior panel 6P is a substantially plate-like member having main surfaces along a YZ plane. The main surface of the exterior panel 6P facing in the −X direction constitutes a part of the side surface 6. The exterior panel 6P is formed of resin such as acrylonitrile-butadiene-styrene (ABS) copolymers, for example.

The hole 120 is provided at a position facing in the +Y direction on an upper side of the exterior panel 6P. The hole 120 is an elongated slit along the Z-axis.

Figure 8:
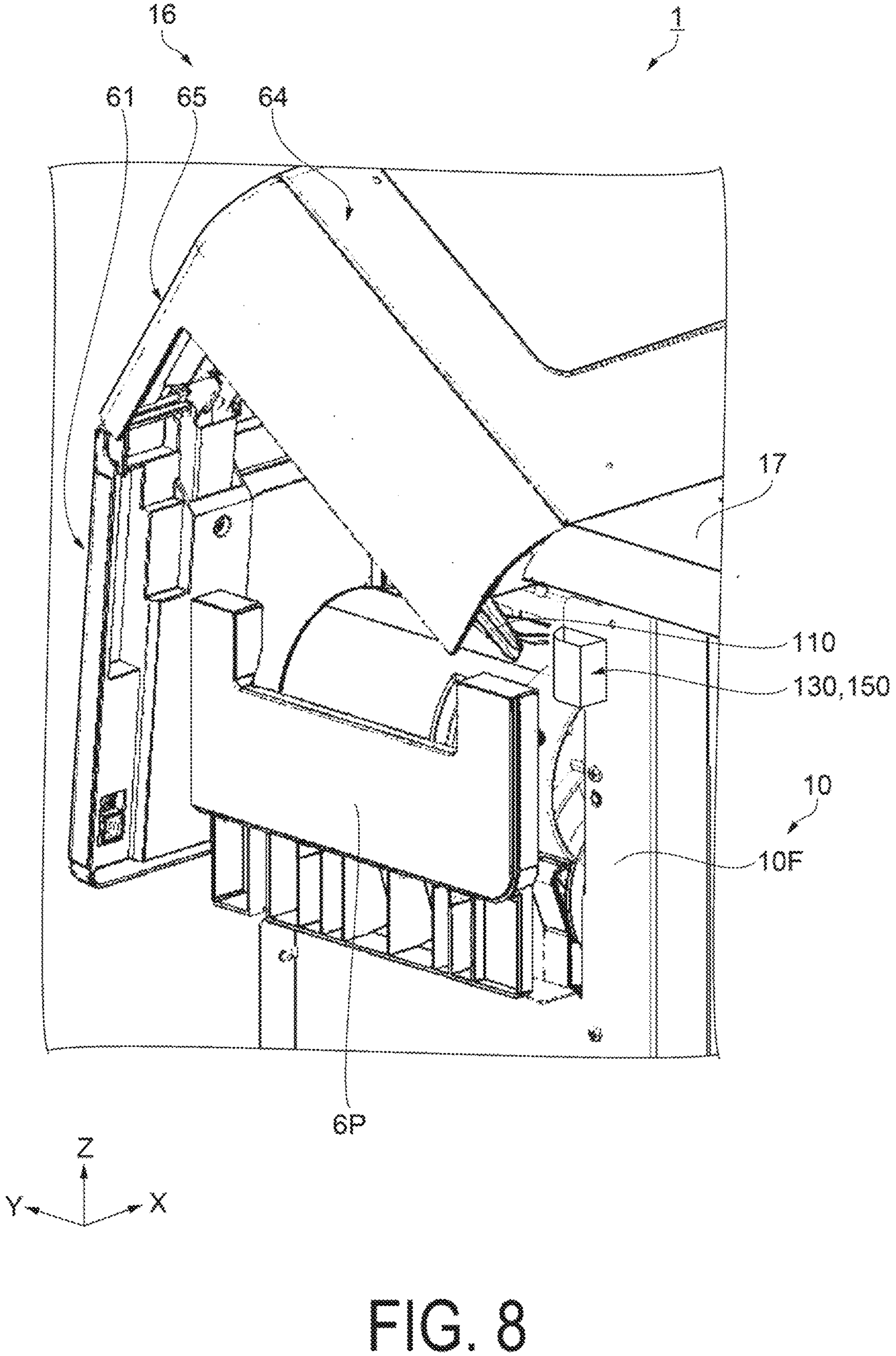
FIG. 8 is an enlarged perspective view illustrating a disposition of an inside of the exterior panel of a side surface.

As illustrated in FIG. 8, the apparatus main body 10 includes a frame member 10F constituting a part of the apparatus main body 10. Here, in FIG. 8, as for the exterior panel 6P, only a part of the exterior panel 6P is illustrated.

The frame member 10F is, for example, a metallic member subjected to sheet metal processing. The deformation portion 130 and the detection unit 150 are attached to the frame member 10F.

Figure 9:
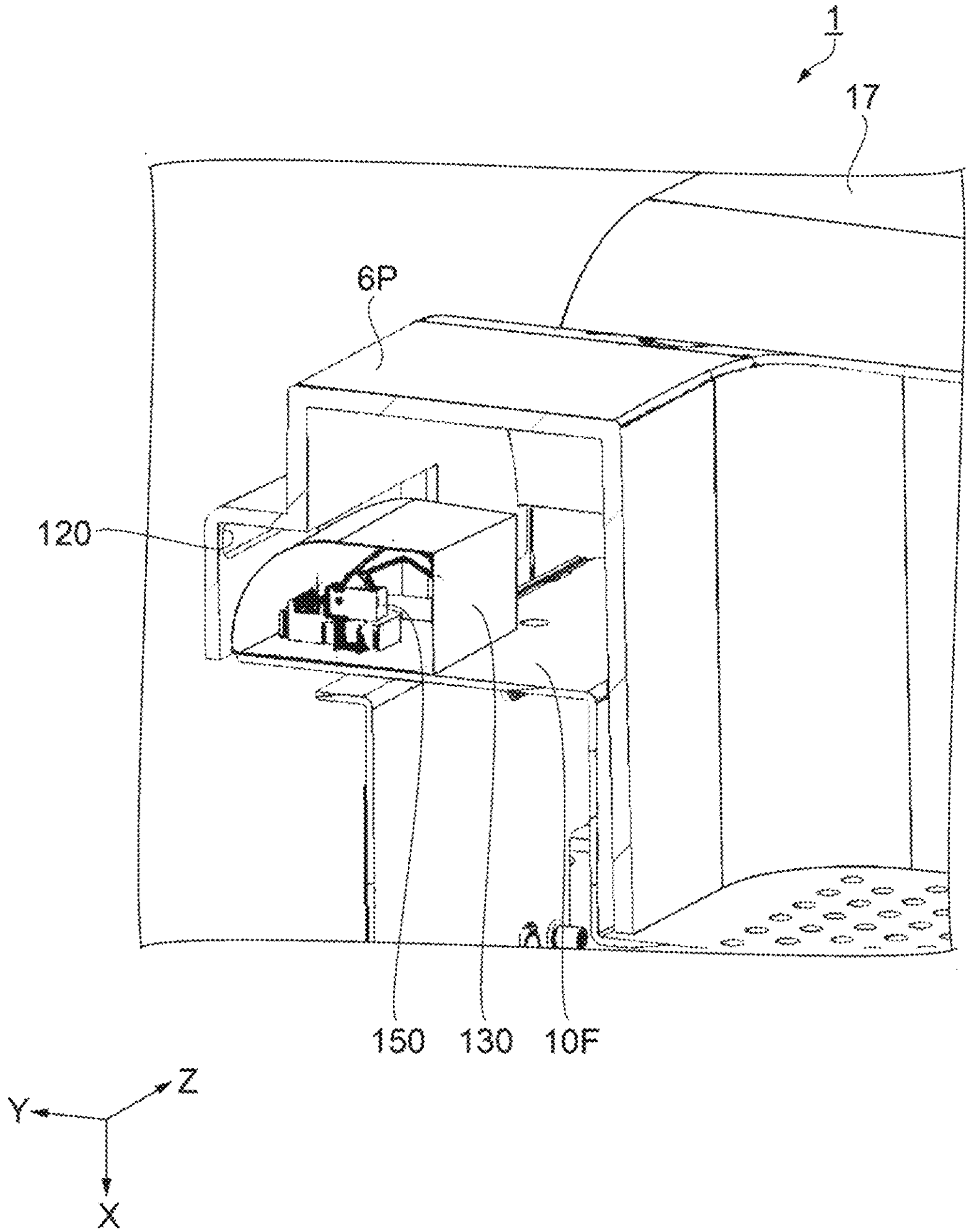
FIG. 9 is a schematic diagram illustrating a disposition of a deformation portion and a detection unit with respect to the hole.

As illustrated in FIG. 9, the deformation portion 130 and the detection unit 150 are disposed relatively near the hole 120 in the −Y direction. The deformation portion 130 and the detection unit 150 are attached to a region along the YZ plane of the frame member 10F.

When viewed from the −Z direction, the deformation portion 130 surrounds a periphery of the detection unit 150. FIG. 9 illustrates a state where the above pressing portion 110 is not inserted into the hole 120, that is, a state that is not the door closed state.

In the direction along the X-axis, the position of the hole 120 corresponds to a region including end portions of the deformation portion 130 and the detection unit 150 in the −X direction. Therefore, when the pressing portion 110 is inserted from the +Y direction through the hole 120, the pressing portion 110 comes into contact with the above region. In the direction along the Z-axis, a width of the deformation portion 130 is larger than a width of the hole 120.

Figure 10:
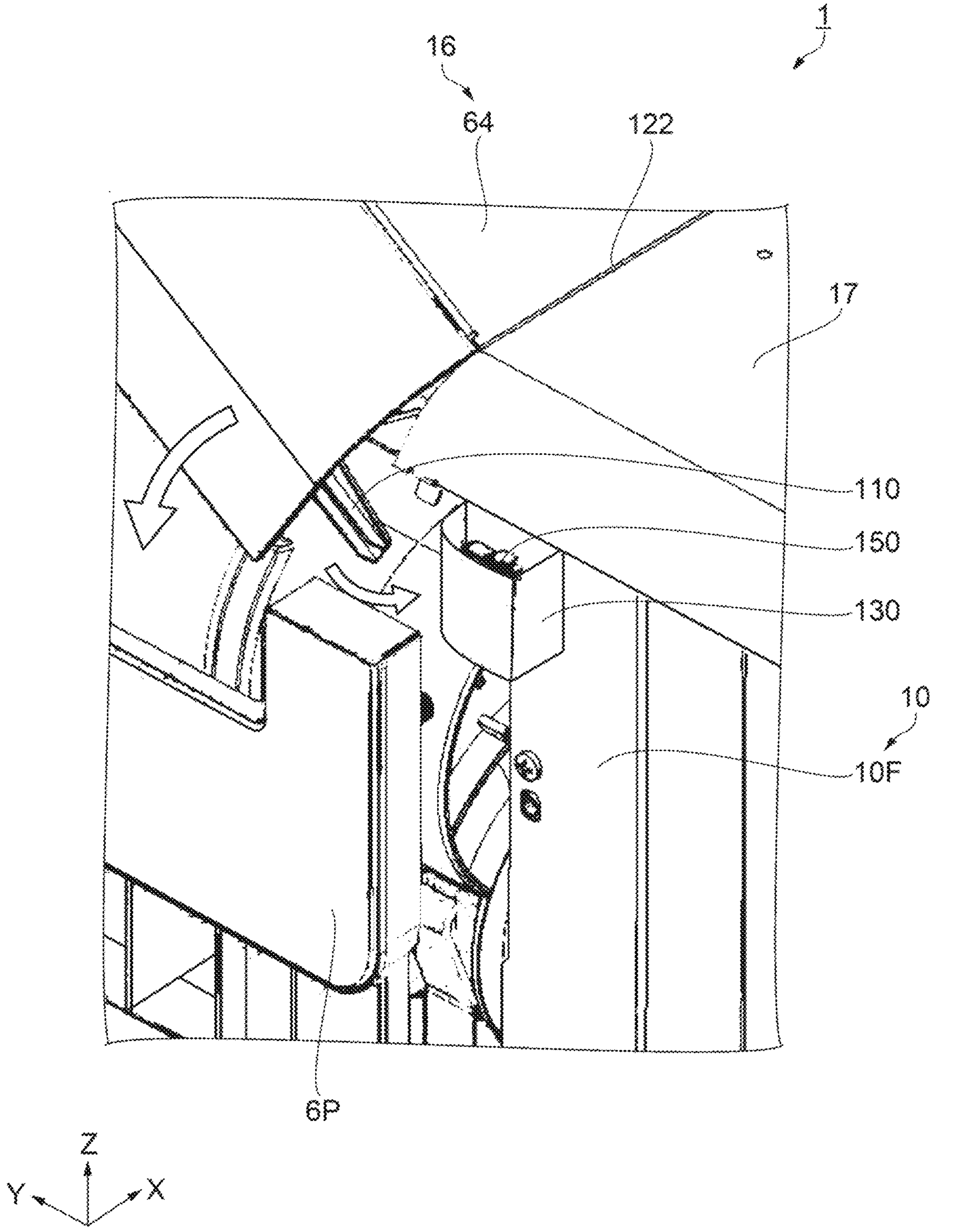
FIG. 10 is a perspective view illustrating movement of a pressing portion in a process of closing the door portion.

As illustrated in FIG. 10, when the door portion 16 is closed from the door opened state, the +Y direction side of the top surface panel portion 64 is lowered. Here, in FIG. 10 and FIG. 11 described below, only a part of the exterior panel 6P is illustrated as in FIG. 8.

In side view from the −X direction, the top surface panel portion 64 moves counterclockwise with the coupling portion 122, which is a boundary between the top surface panel portion 64 and the top surface portion 17, as a rotational center. Accordingly, the pressing portion 110 also moves counterclockwise. At this time, the pressing portion 110 is located at a position relatively near the coupling portion 122, and thus moves substantially in the −Y direction with respect to the deformation portion 130 and the detection unit 150.

Figure 11:
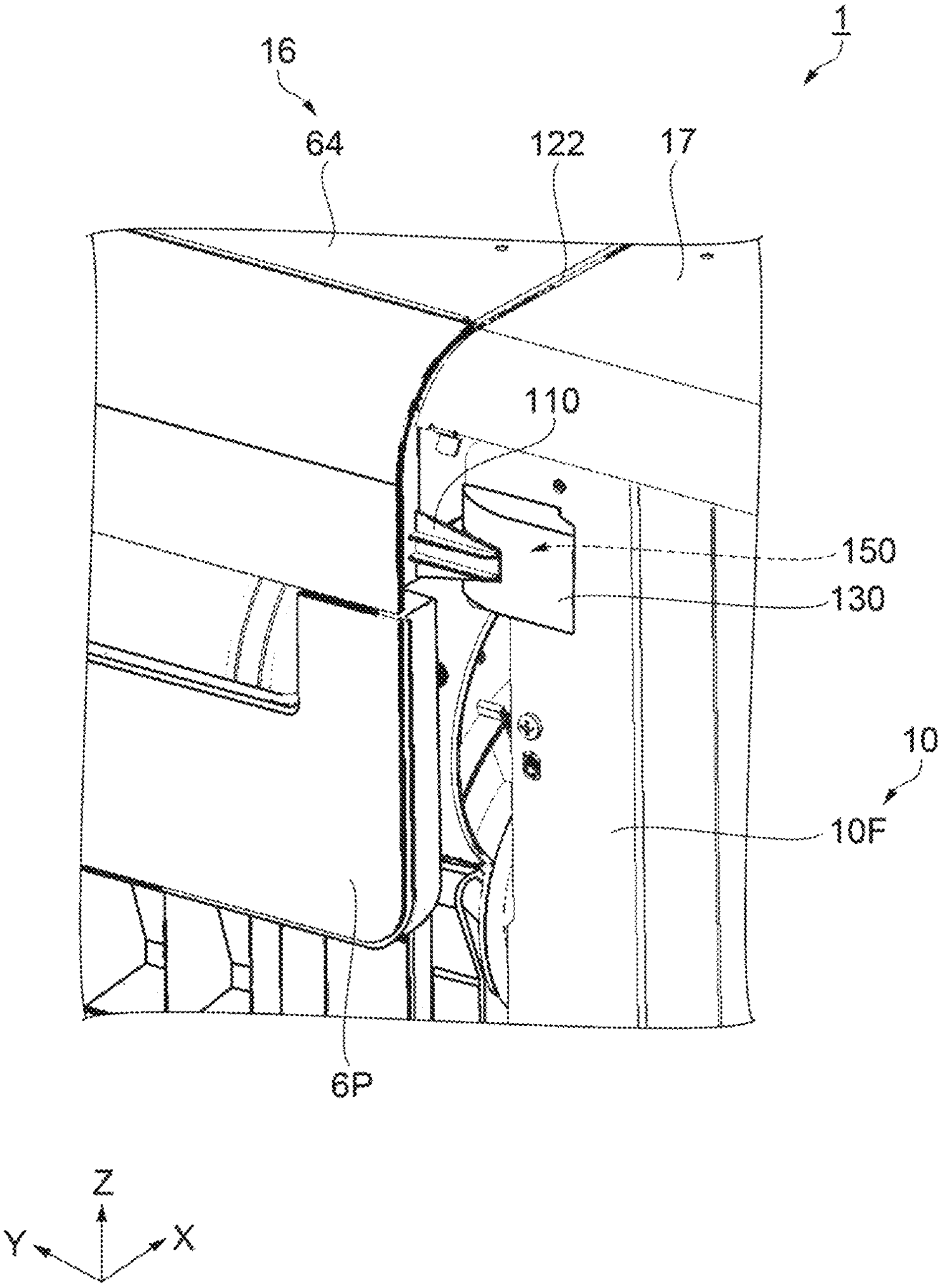
FIG. 11 is a schematic diagram illustrating a disposition of the pressing portion, the deformation portion, and the detection unit in the door closed state.

As illustrated in FIG. 11, in the door closed state, the pressing portion 110 comes into contact with the deformation portion 130 and the detection unit 150. Specifically, the detection unit 150 indirectly comes into contact with the pressing portion 110 via the deformation portion 130. The deformation portion 130 is pressed substantially in the −Y direction by the pressing portion 110 and deformed. The deformation of the deformation portion 130 will be described later.

Figure 12:
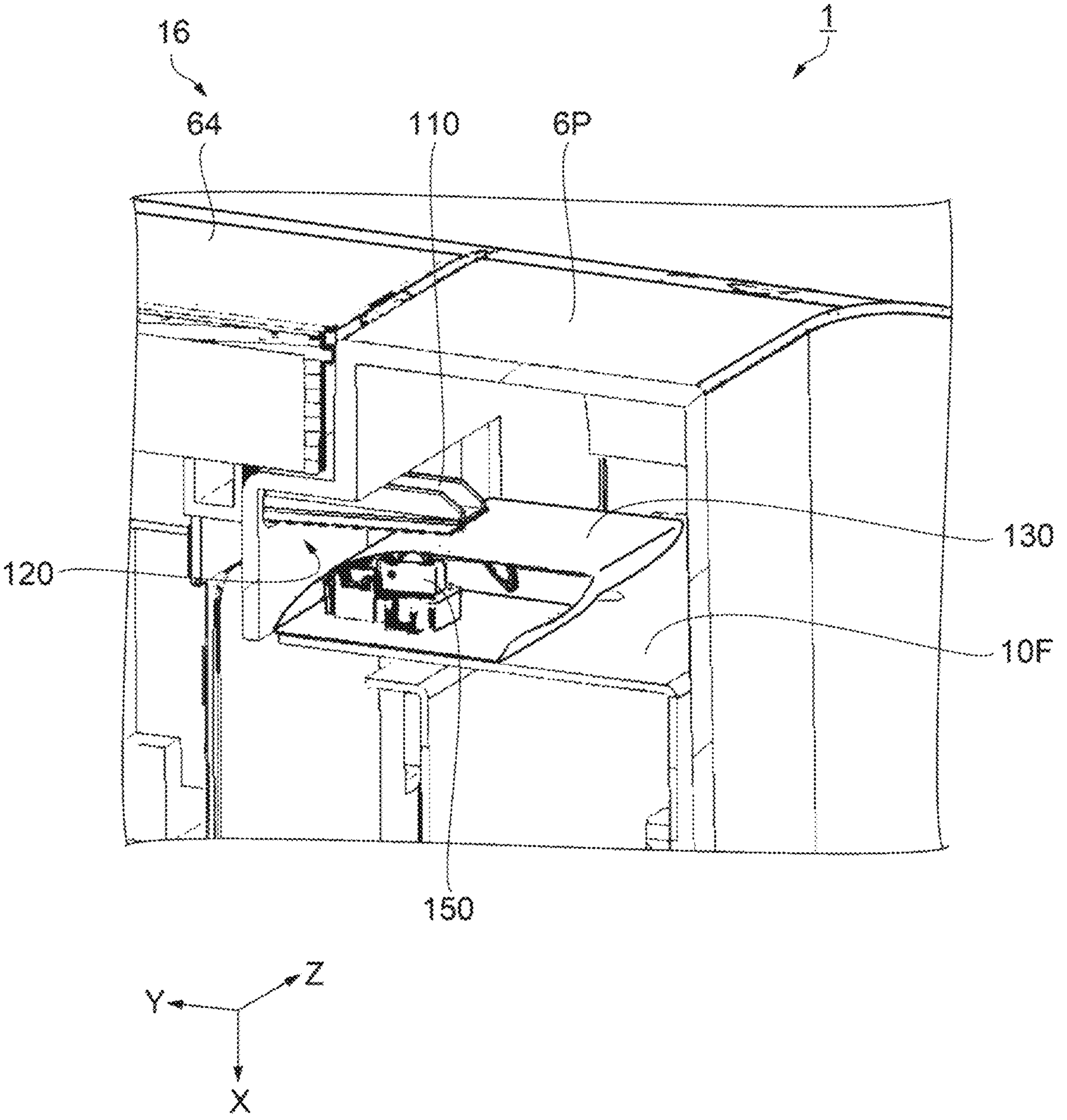
FIG. 12 is a schematic diagram illustrating the disposition of the pressing portion, the deformation portion, and the detection unit in the door closed state.

As illustrated in FIG. 12, in the door closed state, the pressing portion 110 is inserted inward the exterior panel 6P through the hole 120 of the exterior panel 6P. In the direction along the Y-axis, the deformation portion 130 and the detection unit 150 are disposed relatively near the hole 120. A traveling direction of the pressing portion 110 when the pressing portion 110 passes through the hole 120 is substantially the −Y direction. When inserted inward the exterior panel 6P from the hole 120, the pressing portion 110, while being in contact with and pressing the deformation portion 130 and the detection unit 150, advances in the substantially −Y direction.

At this time, the deformation portion 130 is deformed, the detection unit 150 is pressed by the pressing portion 110 via the deformation portion 130, and a lever portion 151 to be described later is displaced. That is, when the door portion 16 is closed, the state illustrated in FIG. 9 transits to the state illustrated in FIG. 12.

Figure 13:
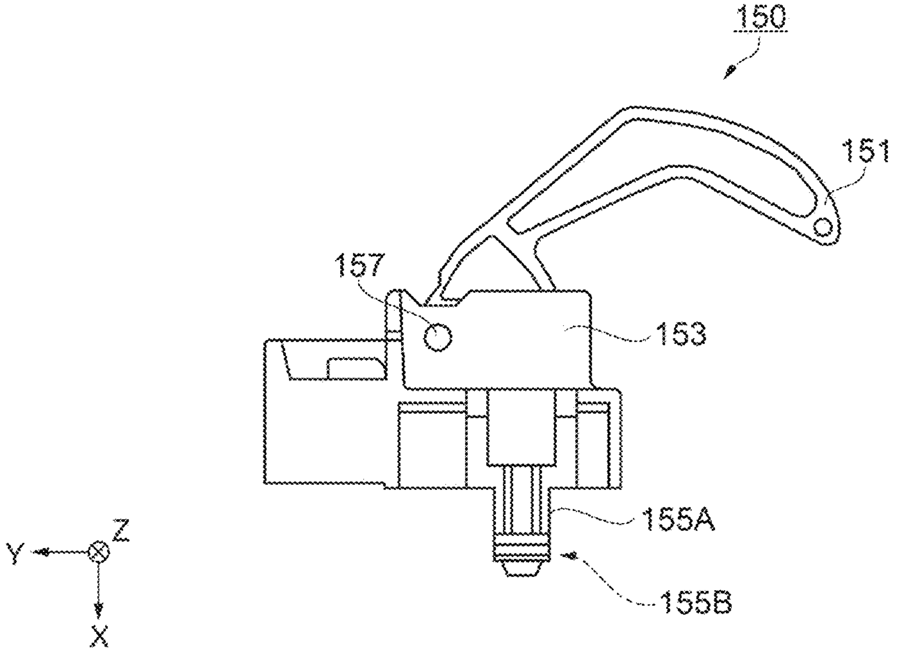
FIG. 13 is a diagram illustrating a configuration of the detection unit.
Figure 14:
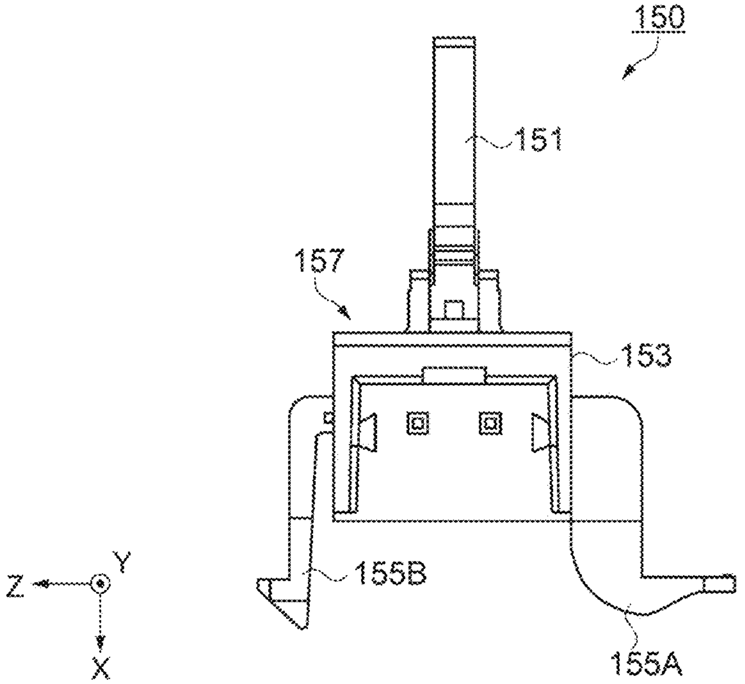
FIG. 14 is a diagram illustrating the configuration of the detection unit.
Figure 15:
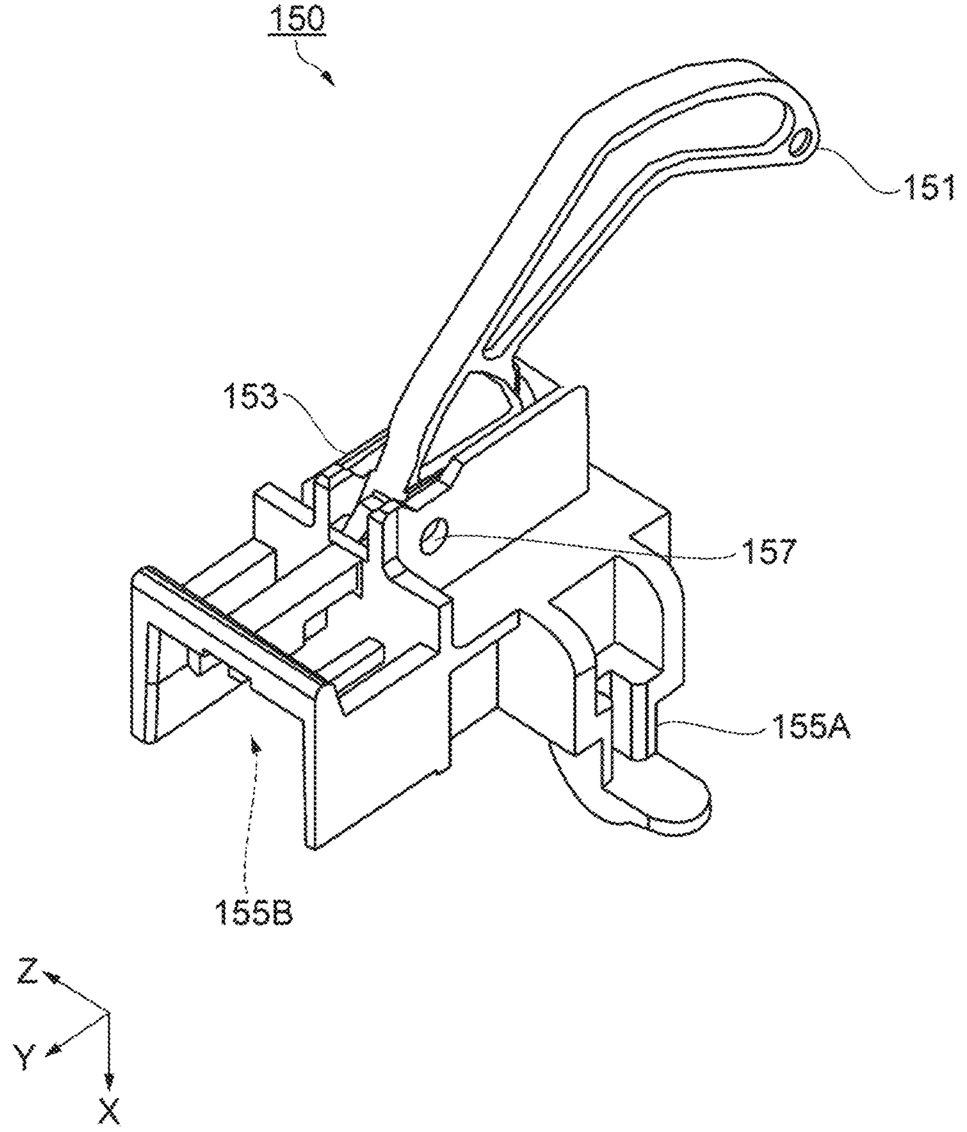
FIG. 15 is a diagram illustrating the configuration of the detection unit.

As illustrated in FIGS. 13, 14, and 15, the detection unit 150 includes the lever portion 151, a main body portion 153, protruding portions 155A and 155B, and a displacement shaft 157. The detection unit 150 detects that the above door portion 16 is in a closed state, that is, the door closed state. Note that FIGS. 13 to 15 illustrate the detection unit 150 in a case of being not in the door closed state.

The main body portion 153 is a substantially rectangular parallelepiped housing. The main body portion 153 accommodates a biasing member and a sensor (not illustrated) therein, and supports the lever portion 151 by the displacement shaft 157. The protruding portions 155A and 155B protruding in the +X direction are disposed at side surfaces of the main body portion 153 in the +Z direction and the −Z direction. Although not illustrated, wiring lines and the like that electrically couple the above-described control board 18 and the above sensor and the like are disposed at the main body portion 153.

The lever portion 151 protrudes substantially in the −X direction from the main body portion 153, and is supported by the main body portion 153. A partial region of the lever portion 151 in the +X direction enters inside the main body portion 153. When viewed from the −Z direction, the lever portion 151 is supported by the main body portion 153 and reciprocates in an arc shape with the displacement shaft 157 as a rotational center. When the door opened state transits to the door closed state, the lever portion 151 is pressed substantially in the −Y direction via the deformation portion 130 so as to fall in the −Y direction. At this time, one portion of the lever portion 151 enclosed in the main body portion 153 is also displaced.

The sensor in the main body portion 153 detects that the state is the door closed state by the displacement of the one portion of the above enclosed lever portion 151. Examples of the detection unit 150 include, in addition to the above lever type, for example, a known sensor such as a cylinder type that presses a protrusion such as a tactile switch or a push switch.

The biasing member in the main body portion 153 is attached to the above enclosed one portion of the lever portion 151 and to the housing of the main body portion 153. The biasing member biases the lever portion 151 so as to be displaced counterclockwise when viewed from the −Z direction, that is, so as to rise. Examples of the biasing member include known biasing members such as a coil spring, a plate spring, and rubber. Note that biasing force by the biasing member is smaller than force with which the detection unit 150 is pressed by the above pressing portion 110.

The protruding portions 155A and 155B are fixing members for attaching the detection unit 150 to the above frame member 10F of the apparatus main body 10. A tip of each of the protruding portions 155A and 155B has a claw shape, and the claw-shaped portion protrudes in the +X direction. The claw-shaped portion is fitted into the frame member 10F to attach the detection unit 150. When the detection unit 150 is attached to the frame member 10F, the deformation portion 130 is also fixed to the frame member 10F at the same time.

Figure 16:
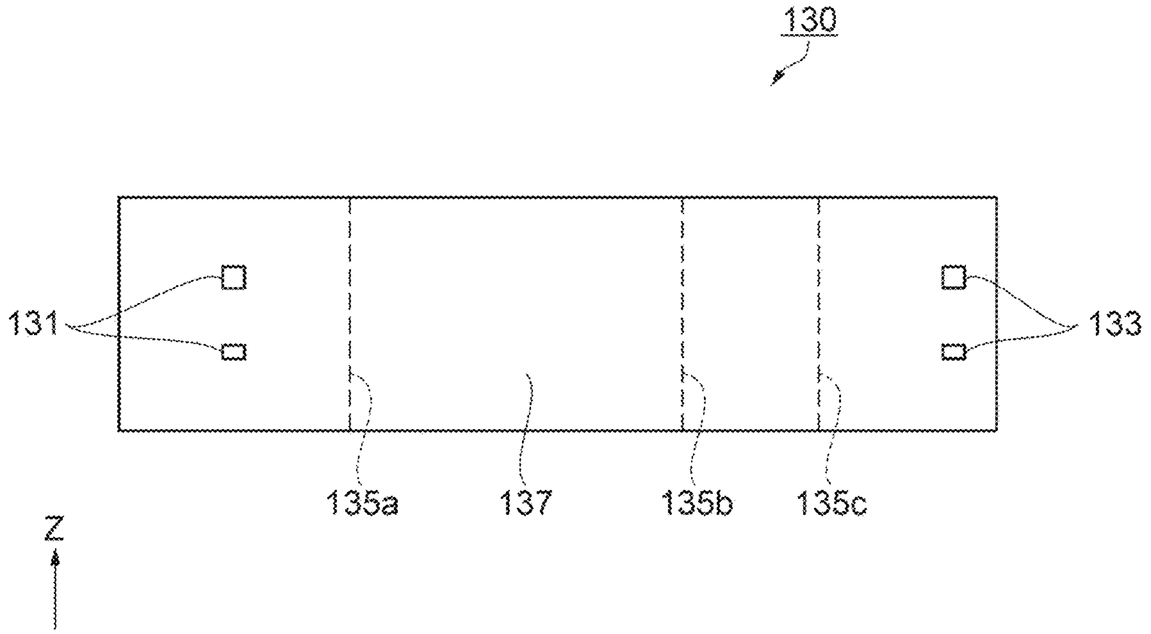
FIG. 16 is an exploded plan view of the deformation portion.

As illustrated in FIG. 16, the deformation portion 130 has a planar shape of a substantially rectangular shape at a stage before being incorporated into the apparatus main body 10. The deformation portion 130 includes a plate-like member having flexibility. Specifically, the deformation portion 130 is a plate-like member, and is a film made of a synthetic resin. The synthetic resin can be procured at a relatively low cost, can be easily processed, and can be used to form the deformation portion 130 having excellent physical properties such as toughness. Examples of the synthetic resin include a polyester resin such as polyethylene terephthalate (PET), and polycarbonate (PC) and polypropylene (PP).

The deformation portion 130 may be made of a material that is less likely to be plastically deformed and has toughness. Examples of the material of the deformation portion 130 include cellophane, paper, and a film-like metal in addition to the above synthetic resin. A thickness of the deformation portion 130 is appropriately set in accordance with the physical properties of the material. The deformation portion 130 may have flexibility and may be rich in elasticity. Note that an unfolded planar shape of the deformation portion 130 is not limited to a substantially rectangular shape.

The deformation portion 130 includes two openings 131 and two openings 133. When the detection unit 150 is fixed to the above frame member 10F, the corresponding protruding portions 155A and 155B of the detection unit 150 are inserted into the openings 131 and 133. Accordingly, the deformation portion 130 is fixed to the frame member 10F together with the detection unit 150.

In a left-right direction in FIG. 16, which is a long side direction of the deformation portion 130, the two openings 131 are provided on a left side which is one end, and the two openings 133 are provided on a right side which is another end. The two openings 131 each have a substantially rectangular shape and are disposed side by side in the direction along the Z-axis. The two openings 133 also each have a substantially rectangular shape and are disposed side by side in the direction along the Z-axis. The openings 131 and 133 corresponding to each other in the above left-right direction have the same planar shape. The two openings 131 have the planar shapes different from each other, and the two openings 133 also have the planar shapes different from each other. Note that the opening 131 and 133 are not limited to holes, and may be notches.

The deformation portion 130 includes fold lines **135*a*, 135*b*, and 135*c*. Each of the fold lines 135*a*, 135*b*, and 135*c* is a line segment along which folding is made when the plate-like deformation portion 130 is assembled to the apparatus main body 10 together with the detection unit 150. The fold lines 135*a*, 135*b*, and 135*c* are each disposed along the Z-axis in an order of the fold lines 135*a*, 135*b*, and 135*c*** from the above left side to the above right side.

The deformation portion 130 includes a pressed surface 137. The pressed surface 137 includes a region that is pressed by the pressing portion 110 when the door portion 16 is closed in the apparatus main body 10. The pressed surface 137 has a substantially rectangular shape, and is provided between the fold line **135*a* and the fold line 135*b***.

Figure 17:
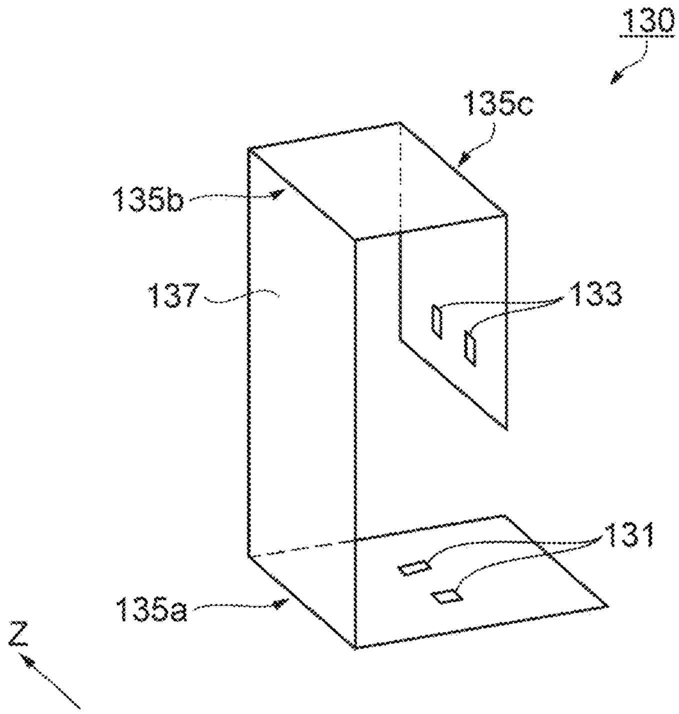
FIG. 17 is a perspective view illustrating an exterior of the deformation portion before assembly.

As illustrated in FIG. 17, the deformation portion 130 is folded along the fold lines **135*a*, 135*b*, and 135*c* before being assembled with the detection unit 150. The deformation portion 130 may be transported and stored in the above-described folded state. Thus, the number of steps at assembly can be reduced. The deformation portion 130** can be transported and stored in a stacked manner in any form of an unfolded state or a folded state, thereby reducing costs required for the transportation and storage.

The folding along the fold lines **135*a*, 135*b*, and 135*c*** may be performed only by physical force, or may be performed by softening the plate-like member by heating and applying force.

Figure 18:
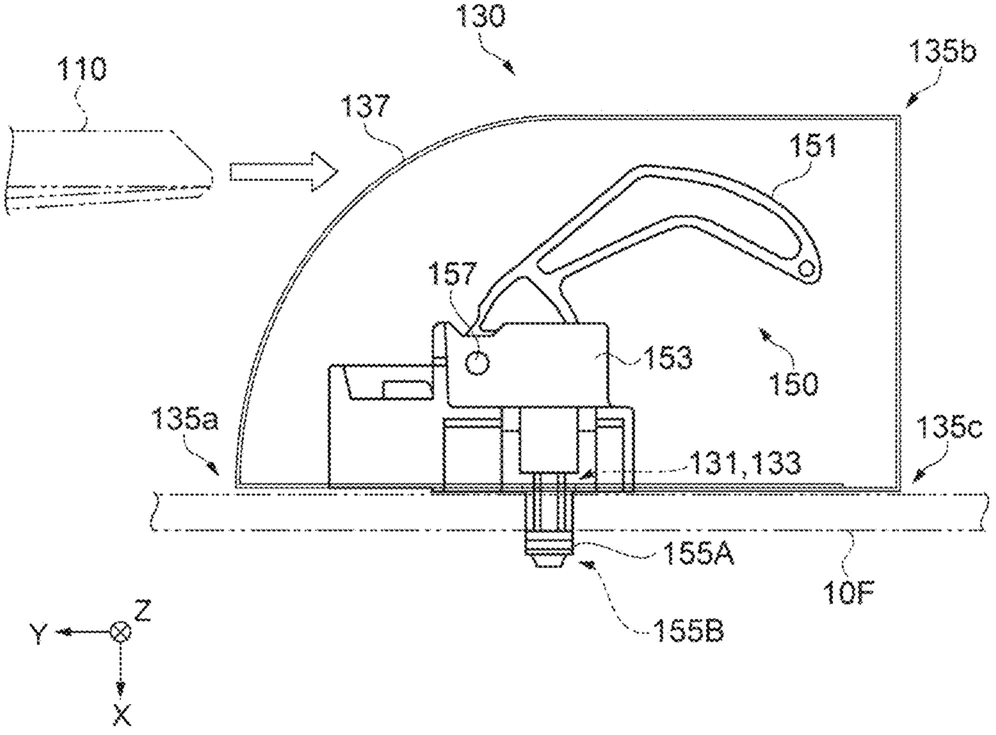
FIG. 18 is a side view illustrating an open state shape of the deformation portion and an exterior of the detection unit.
Figure 19:
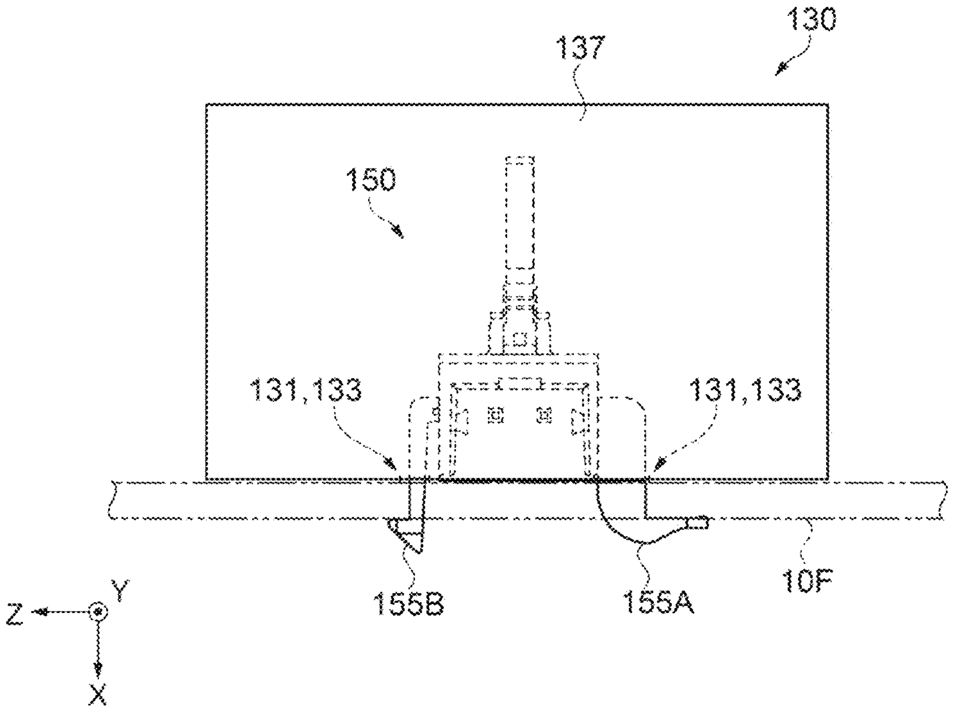
FIG. 19 is a side view illustrating the open state shape of the deformation portion and the exterior of the detection unit.
Figure 20:
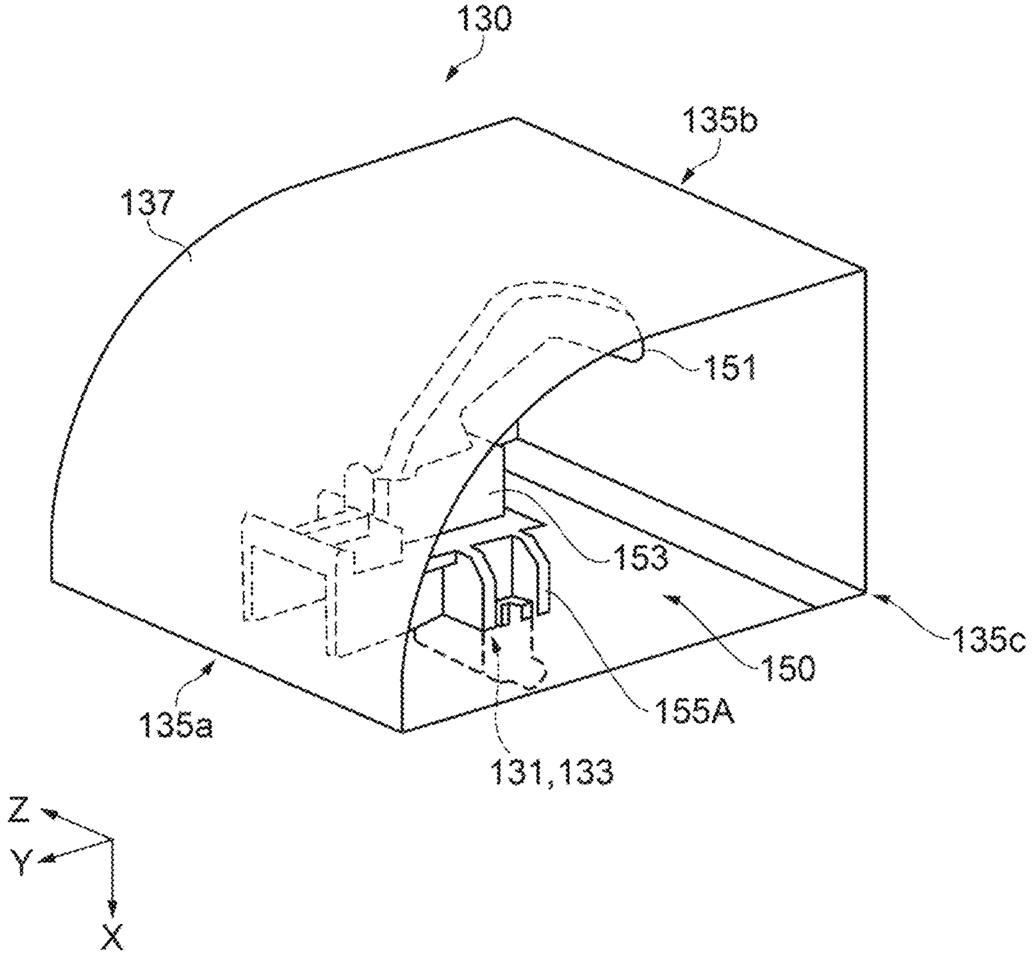
FIG. 20 is a perspective view illustrating the open state shape of the deformation portion and the exterior of the detection unit.

As illustrated in FIGS. 18, 19, and 20, when the deformation portion 130 and the detection unit 150 are assembled and fixed to the frame member 10F, the detection unit 150 is covered with the deformation portion 130 when viewed from the −Z direction.

The frame member 10F is indicated by a two-dot chain line in FIGS. 18 and 19, and the frame member 10F is not illustrated in FIG. 20. In FIG. 18, in a process in which the door portion 16 is closed, the pressing portion 110 is indicated by a two-dot chain line, and the traveling direction of the pressing portion 110 is indicated by an outline arrow. FIGS. 18 to 20 illustrate a state where the above door portion 16 is not in the door closed state and the pressing portion 110 is not in contact with the deformation portion 130. The shape of the deformation portion 130 in this state is referred to as an open state shape.

In the deformation portion 130, the two openings 131 at the one end and the two openings 133 at the other end are overlaid, and the protruding portions 155A and 155B are inserted into the overlaid openings 131 and 133. The protruding portions 155A and 155B are further inserted into openings (not illustrated) of the frame member 10F while being inserted into the openings 131 and 133. Therefore, the protruding portions 155A and 155B and the one end and the other end of the deformation portion 130 are fixed to the apparatus main body 10. The deformation portion 130 and the detection unit 150 are fixed to the apparatus main body 10 with such a simple configuration.

The method of fixing the deformation portion 130 to the frame member 10F is not limited to the above-described method, and may be, for example, a method using a double-sided adhesive tape, a screw, or the like.

The detection unit 150 is disposed at the frame member 10F of the apparatus main body 10 so as to be covered with the pressed surface 137. Specifically, the deformation portion 130 is fixed to the frame member 10F of the apparatus main body 10 in an annular state where the one end and the other end of the above plate-like member are overlaid to form an annulus when viewed from the −Z direction. The detection unit 150 is disposed at the apparatus main body 10 so as to be located inside the annulus. Accordingly, since the detection unit 150 is disposed inside the annulus of the deformation portion 130, breakage of the detection unit 150 is further suppressed.

In the fixing of the deformation portion 130 to the frame member 10F, the above one end and the above other end need not be overlaid when viewed from the +X direction.

In the present embodiment, the openings 131 and 133 corresponding to the direction along the Z-axis are overlaid, but the present disclosure is not limited thereto. For example, the above one end and the above other end need not be overlaid, and may be fixed to the frame member 10F at different positions, respectively, so that the pressed surface 137 is curved. In addition, the deformation portion 130 has been described to be in a substantially annular state, the present disclosure is not limited thereto. When viewed from the −Z direction, the deformation portion 130 may have an arch shape or the like. In this case, the opening 131 and the opening 133 are fixed at positions different from each other.

When the deformation portion 130 is in the open state shape, the lever portion 151 of the detection unit 150 and an inner surface of the deformation portion 130 are separated from each other.

As illustrated in FIG. 18, in the open state shape, when viewed from the −Z direction, an interval from the fold line 135*a* to the fold line 135*b* has a curved shape. In other words, the pressed surface 137 is curved in a convex shape so as to face in the substantially −Y direction, which is the traveling direction when the pressing portion 110 passes through the hole 120. Accordingly, the deformation portion 130 is easily deformed by the pressing of the pressing portion 110.

When viewed from the −Z direction, an interval between the fold line 135*b* and the fold line 135*c* is substantially along an XZ plane. An interval from the fold line 135*a* to the above one end and an interval from the fold line 135*c* to the above other end are along a plane of the frame member 10F.

As illustrated in FIG. 19, in the direction along the Z-axis, a width of the pressed surface 137, in other words, the width of the deformation portion 130 is larger than a width of the detection unit 150. As described above, in the direction along the Z-axis, the width of the hole 120 is smaller than the width of the deformation portion 130, and the width of the pressed surface 137 is larger than the width of the hole 120.

Figure 21:
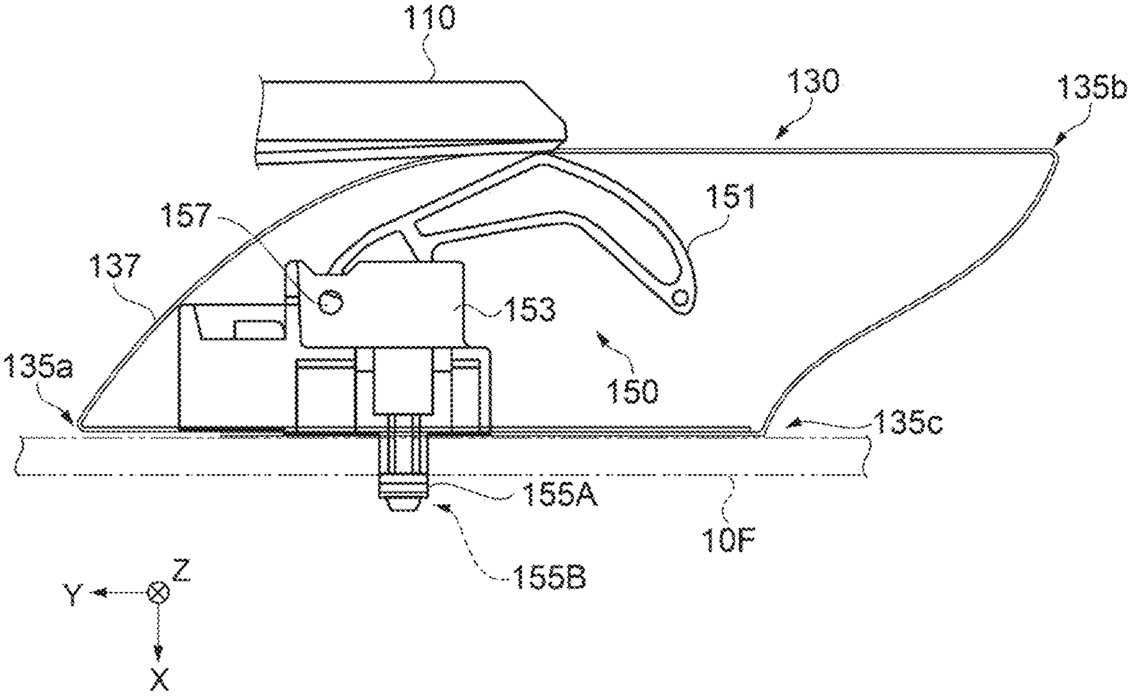
FIG. 21 is a side view illustrating a closed state shape of the deformation portion and the exterior of the detection unit.
Figure 22:
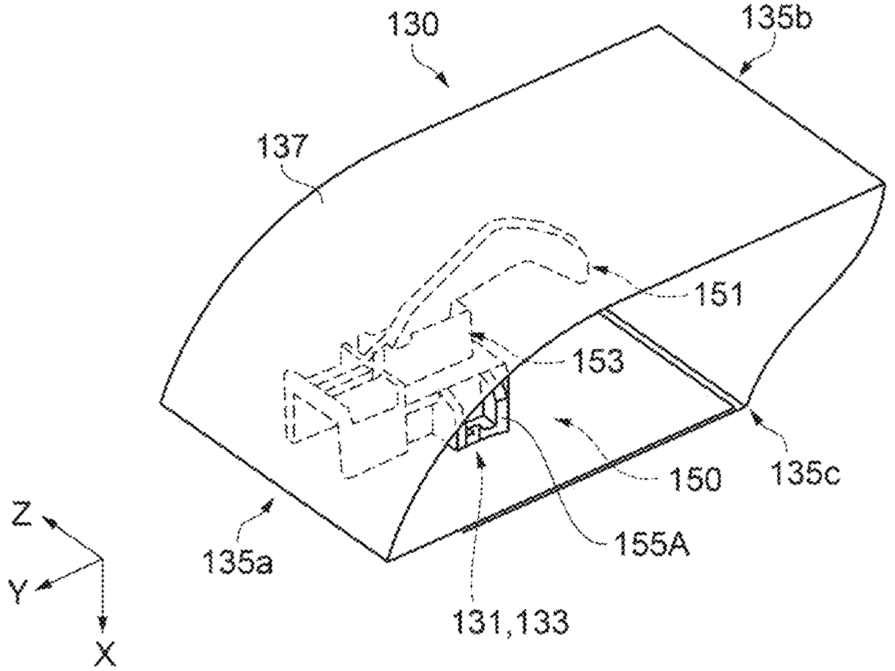
FIG. 22 is a perspective view illustrating the closed state shape of the deformation portion and the exterior of the detection unit.

As illustrated in FIGS. 21 and 22, in the door closed state, the pressed surface 137 and the lever portion 151 of the detection unit 150 are pressed substantially in the −Y direction by the pressing portion 110. The deformation portion 130 is deformed into a closed state shape by being pressed by the of the deformation portion 130 in the door closed state. Note that in FIG. 22, illustration of the pressing portion 110 is omitted.

The deformation portion 130 can be deformed between the open state shape and the closed state shape according to the open/closed state of the above door portion 16 by the action of the pressing portion 110. That is, the shape of the deformation portion 130 transits between the open state shape and the closed state shape depending on whether or not the pressing portion 110 is in contact with the deformation portion 130 and a degree of the contact.

In the door closed state, the pressing portion 110 moves most in the −Y direction, and the lever portion 151 of the detection unit 150 is pressed substantially in the −Y direction by the pressing portion 110 via the pressed surface 137. As a result, the lever portion 151 falls substantially in the −Y direction and is displaced clockwise with the displacement shaft 157 as a rotational center when viewed from the −Z direction, and the above sensor in the main body portion 153 detects that the door portion 16 is in the door closed state.

In the closed state shape of the deformation portion 130, the curve of the pressed surface 137 is gentler than that in the open state shape when viewed from the −Z direction. In addition, an interval from the fold line 135*b* to the fold line 135*c* is bent and deformed. Even in the closed state shape, the interval from the fold line 135*a* to the above one end and the interval from the fold line 135*c* to the above other end are along the plane of the frame member 10F.

The deformation portion 130 is released from the pressing of the pressing portion 110 when the above door portion 16 is opened in a case where the pressed surface 137 is in the closed state shape formed by being pressed by the pressing portion 110. The deformation portion 130 has flexibility, and thus has restoring force against deformation. When released from the above pressing, the deformation portion 130 is deformed to the open state shape by the deformation portion 130's own restoring force. The deformation portion 130 can be repeatedly deformed between the open state shape and the closed state shape.

The lever portion 151 of the detection unit 150 is biased in a rising direction by the biasing member in the main body portion 153. Therefore, when the pressing of the pressing portion 110 is released, the lever portion 151 is also displaced counterclockwise with the displacement shaft 157 as a rotational center when viewed from the −Z direction and is deformed so as to rise substantially in the +Y direction.

In the above embodiment, the inkjet type printing apparatus 1 has been exemplified as the electronic apparatus, but the electronic apparatus of the present disclosure is not limited thereto. The electronic apparatus of the present disclosure may be a printing apparatus such as a laser printer other than the inkjet type, a copying machine or a multifunction peripheral thereof, a measuring instrument such as a balance, a meter, a computer, an audio apparatus, a video apparatus, or the like.

According to the present embodiment, the following effects can be obtained.

Breakage of the detection unit 150 can be suppressed. Specifically, the detection unit 150 is pressed by the pressing portion 110 via the pressed surface 137 of the deformation portion 130, and the width of the pressed surface 137 is larger than the width of the detection unit 150 and the width of the hole 120. Therefore, even when an object imitating the pressing portion 110 is inserted into the hole 120 and unintended external force is applied, the detection unit 150 is protected by the deformation portion 130. Therefore, it is possible to provide the printing apparatus 1 in which breakage of the detection unit 150 is suppressed.

Since the deformation portion 130 covers the detection unit 150, the detection unit 150 is protected against static electricity caused by a user or the like, liquid entering from the hole 120, or the like. As a result, it is possible to prevent breakage of electric circuits and components of the detection unit 150. In addition, since the deformation portion 130 has a relatively simple configuration, it is possible to suppress an increase in cost such as material cost and assembling labor charge.

The protruding portions 155A and 155B of the detection unit 150 are used to fix the deformation portion 130 and the detection unit 150 to the frame member 10F. Further, the protruding portions 155A and 155B are fitted into and fixed to the frame member 10F. Thus, a special component for fixing is not required, and assembly can be performed with a simple configuration.

Since the film is used as the deformation portion 130, the plate-like member can be manufactured by cutting the film. As compared with a case where a three-dimensional shape is produced by injection molding or the like, a complicated mold or the like is not required, and the three-dimensional shape can be produced at low cost.

In the direction in which the pressing portion 110 presses, the deformation portion 130 is deformed so as to release the pressing force. Therefore, even when the door portion 16 is violently closed, strong impact is hardly transmitted to the detection unit 150, and it is possible to suppress breakage of the detection unit 150.

2. Second Embodiment

In the present embodiment, a deformation portion 230 applicable to the printing apparatus 1 of the above embodiment will be exemplified. The deformation portion 230 according to the present embodiment is different in form from the deformation portion 130 of the above embodiment. In the following description, the same components as those of the first embodiment are denoted by the same reference numerals, and redundant description will be omitted.

Figure 23:
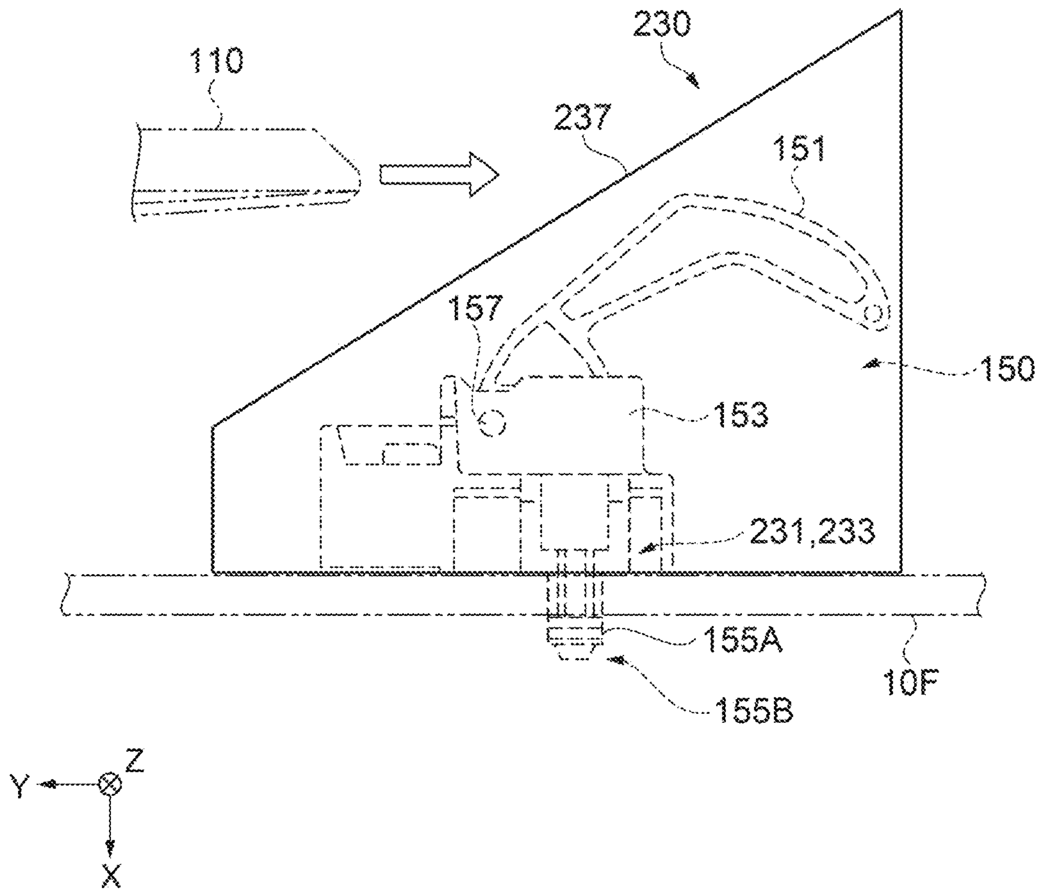
FIG. 23 is a side view illustrating an exterior of an open state shape of a deformation portion according to a second embodiment.
Figure 24:
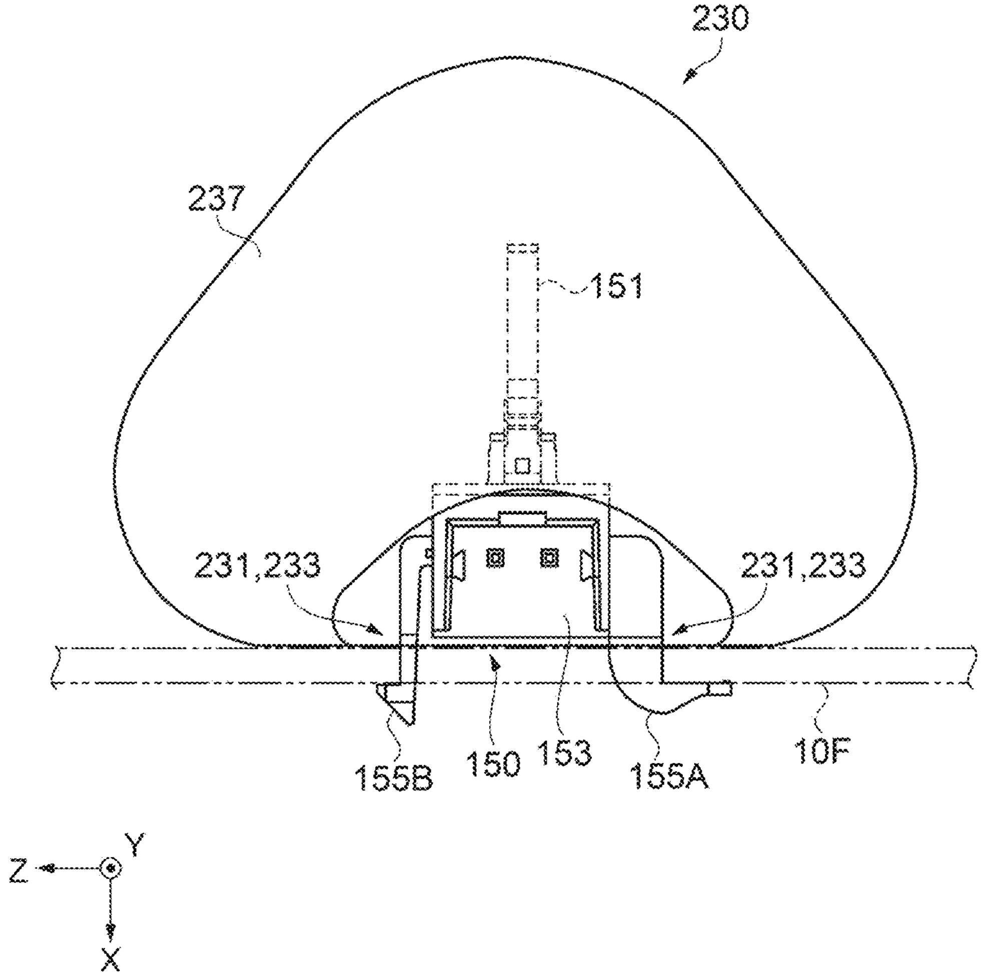
FIG. 24 is a side view illustrating the exterior of the open state shape of the deformation portion.

As illustrated in FIGS. 23 and 24, when the deformation portion 230 and the detection unit 150 are assembled and fixed to the frame member 10F, the detection unit 150 is covered with the deformation portion 230 when viewed from the −Z direction and the +Y direction. Note that in FIGS. 23 and 24, the frame member 10F is indicated by a two-dot chain line. In FIG. 23, the pressing portion 110 when the above door portion 16 is closed is indicated by a two-dot chain line, and the traveling direction of the pressing portion 110 is indicated by an outline arrow.

Although not illustrated, the deformation portion 230 is a plate-like member. A planar shape of the expanded deformation portion 230 is a substantially isosceles trapezoid. When the deformation portion 230 is fixed to the frame member 10F, a long side of a pair of parallel opposite sides of the trapezoid is disposed in the −Y direction, and a short side thereof is disposed in the +Y direction.

The deformation portion 230 is provided with two openings 231 in a vicinity of one leg of the trapezoid which is one end, and two openings 233 in a vicinity of another leg which is another end. The two openings 231 and the two openings 233 correspond to the protruding portions 155A and 155B of the detection unit 150.

In the deformation portion 230, the two openings 231 at the one end and the two openings 233 at the other end are overlaid, and the protruding portions 155A and 155B are inserted into the overlaid openings 231 and 233. The protruding portions 155A and 155B are further inserted into openings (not illustrated) of the frame member 10F while being inserted into the openings 231 and 233. Accordingly, the protruding portions 155A and 155B and the one end and the other end of the deformation portion 230 are fixed to the apparatus main body 10.

Each of the number of opening 231 and the number of opening 233 may be one, and the protruding portion 155B may be inserted into the opening 231 and the protruding portion 155A may be inserted into the opening 233 to be fixed to the frame member 10F.

The detection unit 150 is disposed at the frame member 10F of the apparatus main body 10 so as to be covered with a pressed surface 237. Specifically, the deformation portion 230 is fixed to the frame member 10F of the apparatus main body 10 in an annular state where the one end and the other end of the above plate-like member are overlaid to form an annulus when viewed from the −Y direction. The detection unit 150 is disposed at the apparatus main body 10 so as to be located inside the annulus. Accordingly, since the detection unit 150 is disposed inside the annulus of the deformation portion 230, breakage of the detection unit 150 is further suppressed.

As illustrated in FIG. 23, when viewed from the −Z direction, the pressed surface 237 is inclined with respect to the substantially −Y direction which is the traveling direction when the pressing portion 110 passes through the above hole 120. Accordingly, the deformation portion 230 is easily deformed by the pressing of the pressing portion 110.

As illustrated in FIG. 24, in the direction along the Z-axis, a width of the pressed surface 237, in other words, a width of a deformation portion 230 is larger than the width of the detection unit 150. As described above, in the direction along the Z-axis, the width of the hole 120 is smaller than the width of the deformation portion 230, and the width of the pressed surface 237 is larger than the width of the hole 120.

Figure 25:
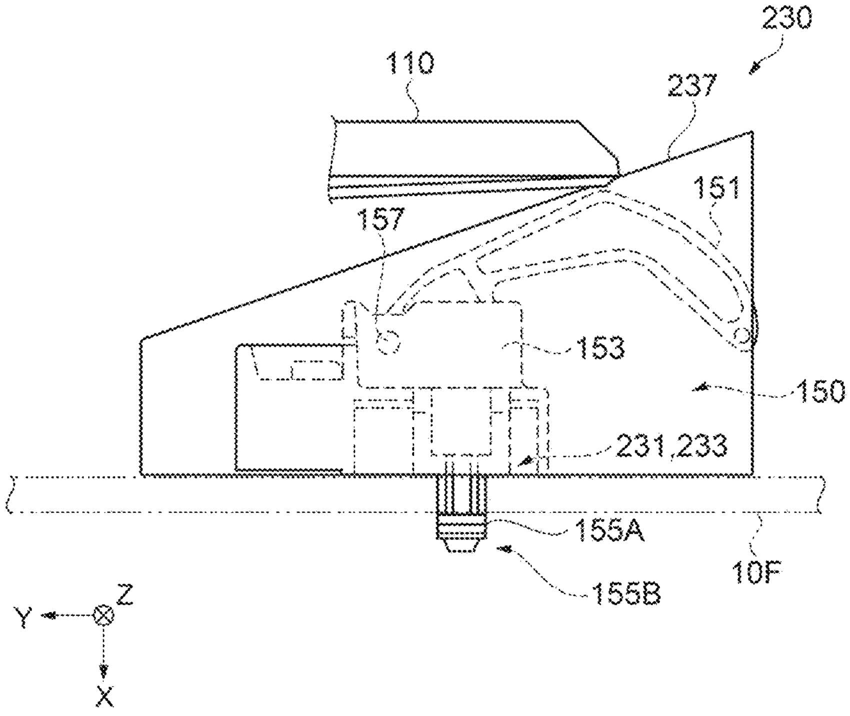
FIG. 25 is a side view illustrating an exterior of the deformation portion and the detection unit in the closed state shape.
Figure 26:
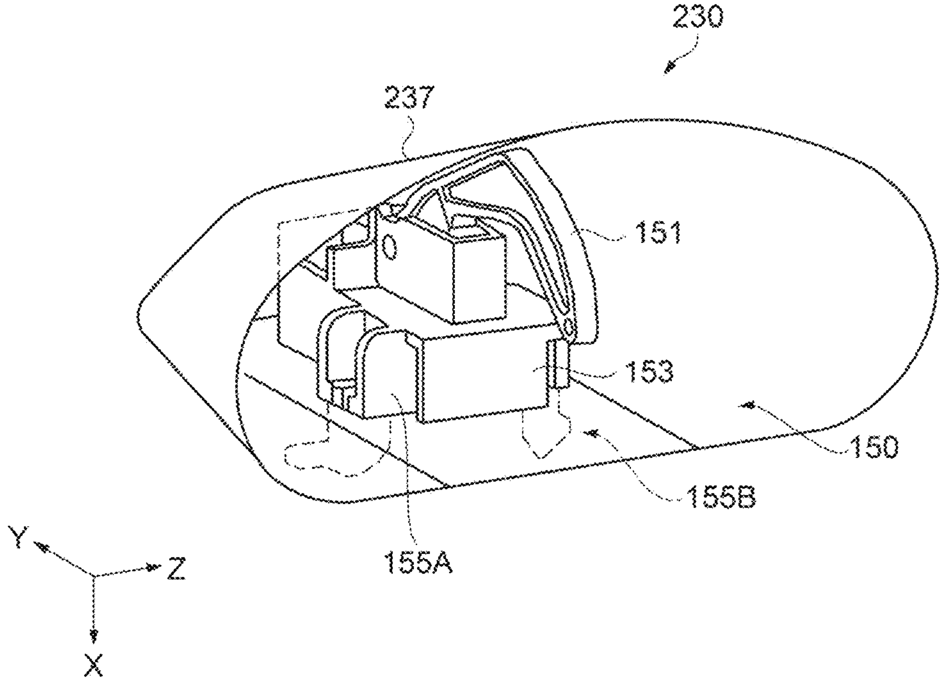
FIG. 26 is a perspective view illustrating the exterior of the deformation portion and the detection unit in the closed state shape.

As illustrated in FIGS. 25 and 26, in a door closed state, the pressed surface 237 and the lever portion 151 of the detection unit 150 are pressed substantially in the −Y direction by the pressing portion 110. The deformation portion 230 is deformed into a closed state shape by being pressed by the of the deformation portion 230 in the door closed state. Note that the pressing portion 110 is illustrated only in FIG. 25.

The deformation portion 230 can be deformed between an open state shape and the closed state shape according to an open/closed state of the door portion 16 by the action of the pressing portion 110. That is, the shape transits between the open state shape and the closed state shape depending on whether or not the pressing portion 110 is in contact with the deformation portion 230 and a degree of the contact.

In the closed state shape of the deformation portion 230, an inclination of the pressed surface 237 with respect to the Y-axis is gentler than that in the open state shape when viewed from the −Z direction.

The deformation portion 230 is released from the pressing of the pressing portion 110 when the above door portion 16 is opened in a case where the pressed surface 237 is in the closed state shape formed by being pressed by the pressing portion 110. The deformation portion 230 has flexibility, and thus has restoring force against deformation. The deformation portion 230 is deformed into the open state shape by the deformation portion 230's own restoring force. The deformation portion 230 can be repeatedly deformed between the open state shape and the closed state shape.

The deformation portion 230 can be applied to the various electronic switch components described above as the detection unit 150. The deformation portion 230 and the detection unit 150 can be applied to the electronic apparatus described above in addition to the printing apparatus 1.

According to the present embodiment, it is possible to obtain the same effects as those of the above-described embodiment.

What is claimed is:

1. An electronic apparatus, comprising:
an apparatus main body;
a door portion supported by the apparatus main body so as to be openable and closable;
a pressing portion disposed at the door portion;
a deformation portion that is deformable between an open state shape and a closed state shape in accordance with an open/closed state of the door portion by an action of the pressing portion, and is configured to be deformed to the closed state shape when a pressed surface is pressed by the pressing portion; and
a detection unit configured to detect that the door portion is in a closed state by being pressed by the pressing portion via the pressed surface, wherein
a hole into which the pressing portion is inserted is formed at the apparatus main body,
the pressed surface and the detection unit are pressed by the pressing portion inserted through the hole,
the deformation portion includes a plate-like member having flexibility, and one end and another end in a long side direction of the plate-like member are fixed to the apparatus main body,
the detection unit is disposed at the apparatus main body so as to be covered with the pressed surface, and
a width of the pressed surface is larger than a width of the detection unit and a width of the hole.

2. The electronic apparatus according to claim 1, wherein
the pressed surface is inclined or curved with respect to a traveling direction of the pressing portion when the pressing portion passes through the hole.

3. The electronic apparatus according to claim 2, wherein
the deformation portion is fixed to the apparatus main body in an annular state where the one end and the other end of the plate-like member are overlaid to form an annulus, and
the detection unit is disposed at the apparatus main body so as to be located inside the annulus.

4. The electronic apparatus according to claim 1, wherein
the plate-like member is a film made of a synthetic resin.

5. The electronic apparatus according to claim 1, wherein
when the door portion is opened in a case where the pressed surface is in the closed state shape formed by being pressed by the pressing portion, the deformation portion is released from pressing by the pressing portion, and is deformed to the open state shape by a restoring force thereof.

6. The electronic apparatus according to claim 1, wherein
an opening is formed at each of the one end and the other end,
the detection unit includes a protruding portion to be attached to the apparatus main body, and
the protruding portion is inserted into the opening and fixed to the apparatus main body.

7. The electronic apparatus according to claim 6, wherein
the plate-like member is a film made of a synthetic resin.

8. The electronic apparatus according to claim 6, wherein
when the door portion is opened in a case where the pressed surface is in the closed state shape formed by being pressed by the pressing portion, the deformation portion is released from pressing by the pressing portion, and is deformed to the open state shape by a restoring force thereof.

9. The electronic apparatus according to claim 4, wherein
when the door portion is opened in a case where the pressed surface is in the closed state shape formed by being pressed by the pressing portion, the deformation portion is released from pressing by the pressing portion, and is deformed to the open state shape by a restoring force thereof.

10. The electronic apparatus according to claim 7, wherein
when the door portion is opened in a case where the pressed surface is in the closed state shape formed by being pressed by the pressing portion, the deformation portion is released from pressing by the pressing portion, and is deformed to the open state shape by a restoring force thereof.

* * * * *